United States Patent
Inoue

(10) Patent No.: US 10,949,152 B2
(45) Date of Patent: Mar. 16, 2021

(54) PRINTING APPARATUS CAPABLE OF CANCELLING PRINT JOB BASED ON USER OPERATION, CONTROL METHOD FOR PRINTING APPARATUS, AND STORAGE MEDIUM

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/417,406

(22) Filed: May 20, 2019

(65) Prior Publication Data
US 2019/0369934 A1 Dec. 5, 2019

(30) Foreign Application Priority Data
May 31, 2018 (JP) .................. 2018-104909

(51) Int. Cl.
G06F 3/12 (2006.01)
H04N 1/00 (2006.01)
H04N 1/327 (2006.01)

(52) U.S. Cl.
CPC .......... G06F 3/1274 (2013.01); G06F 3/1204 (2013.01); G06F 3/1259 (2013.01); H04N 1/00411 (2013.01); H04N 1/32747 (2013.01)

(58) Field of Classification Search
CPC .... G06F 3/1274; G06F 3/1204; G06F 3/1259; G06F 3/126; G06F 3/1267; G06F 3/1271;
(Continued)

(56) References Cited

U.S. PATENT DOCUMENTS

2006/0114492 A1* 6/2006 Noda ............... G06F 3/1215
358/1.14
2013/0335778 A1* 12/2013 Sugiyama ............ G06F 3/1273
358/1.16
(Continued)

FOREIGN PATENT DOCUMENTS

JP 2017170895 A 9/2017

OTHER PUBLICATIONS

The Printer Working Group; IPP Shared Infrastructure Extensions; IPP Operations, https://ftp.pwg.org/pub/pwg/candidates/cs-ippinfra10-20150619-5100.18.pdf; Jun. 19, 2015; pp. 1-91.

*Primary Examiner* — Kent Yip
(74) *Attorney, Agent, or Firm* — Canon U.S.A., Inc. IP Division

(57) ABSTRACT

A control method for a printing apparatus that receives print data from a printing service using Internet Printing Protocol and executes printing of the print data, includes displaying, a list of print jobs held in the printing service, accepting a print instruction for a print job selected from the displayed list, sending, to the printing service, a request for transmitting print data, and printing based on a received print data in response to the request triggered by the print instruction, using a printing device, and requesting the printing service to transmit print data corresponding to a print job selected from the list, in response to acceptance of a cancel instruction for the selected print job, and discarding the print data received from the printing service, without executing printing based on the print data.

7 Claims, 21 Drawing Sheets

(58) Field of Classification Search
CPC ........... H04N 1/00411; H04N 1/32747; H04N 1/00408
USPC ............................................... 358/1.14, 1.15
See application file for complete search history.

(56) References Cited

U.S. PATENT DOCUMENTS

2015/0022851 A1* 1/2015 Kim ...................... G06F 3/1203
 358/1.15
2017/0228197 A1* 8/2017 Watanabe ............. G06F 3/1237

* cited by examiner

FIG.3

| Operation | Client | Infrastructure | Proxy |
|---|---|---|---|
| Cancel-Current-Job | MAY | MAY | MUST NOT |
| Cancel-Document | MAY | MAY | MUST NOT |
| Cancel-Job | MUST | MUST | MUST NOT |
| Cancel-Jobs | MAY | SHOULD | MUST NOT |
| Cancel-My-Jobs | MUST | MUST | MUST NOT |
| Create-Job | MUST | MUST | MUST NOT |
| Update-Job-Status | MUST NOT | MUST | MUST |
| Update-Document-Status | MUST NOT | MUST | MUST |

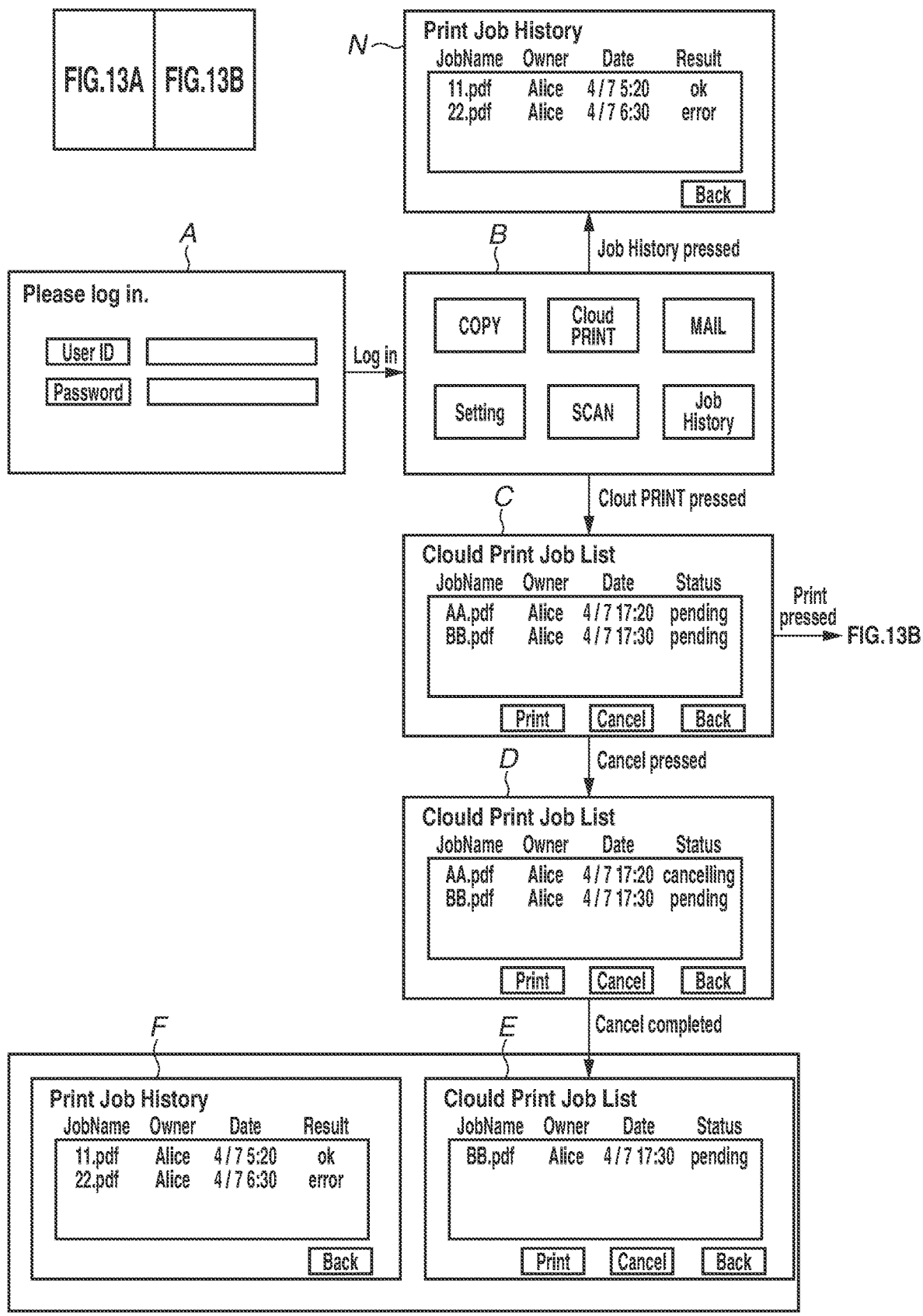

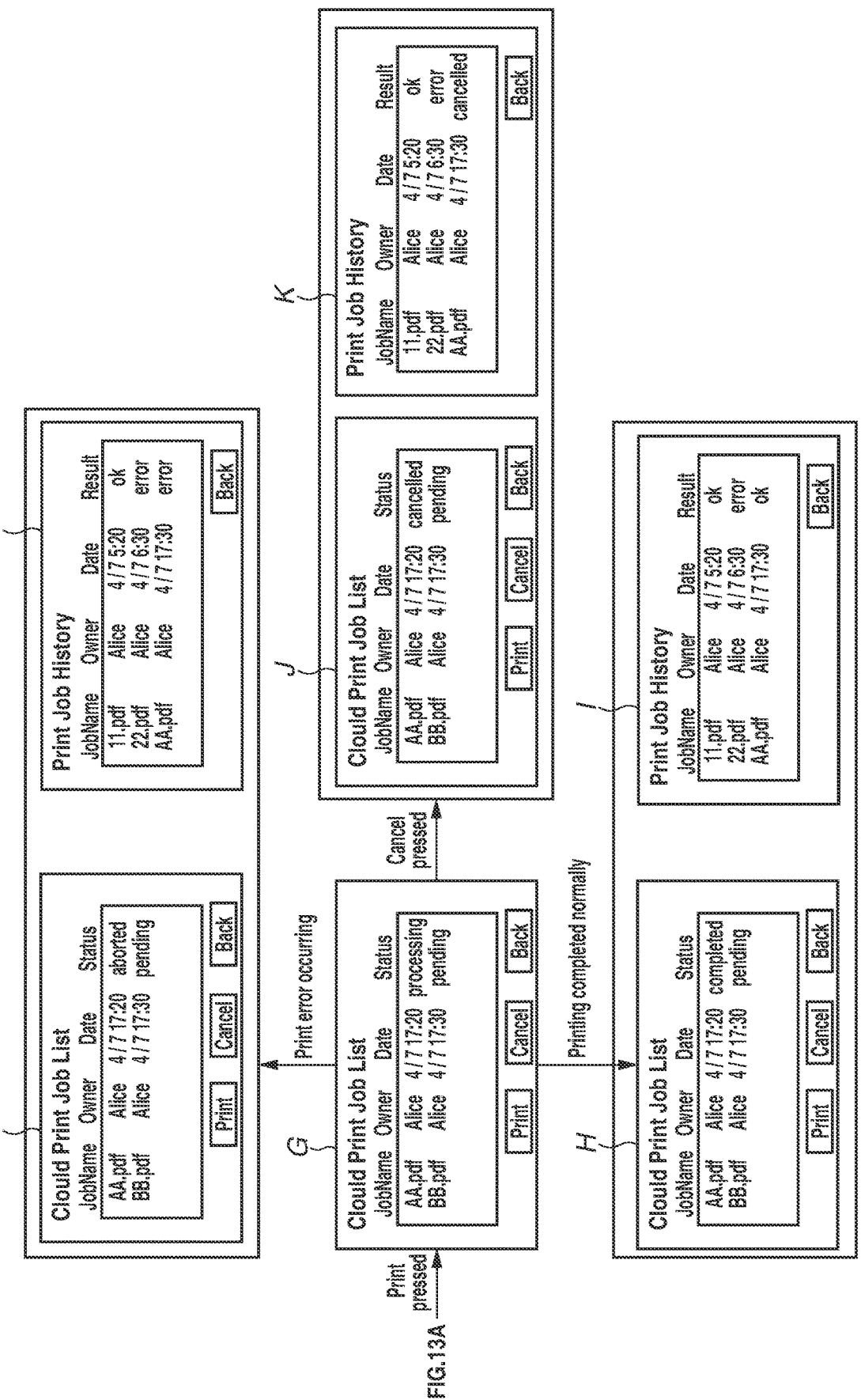

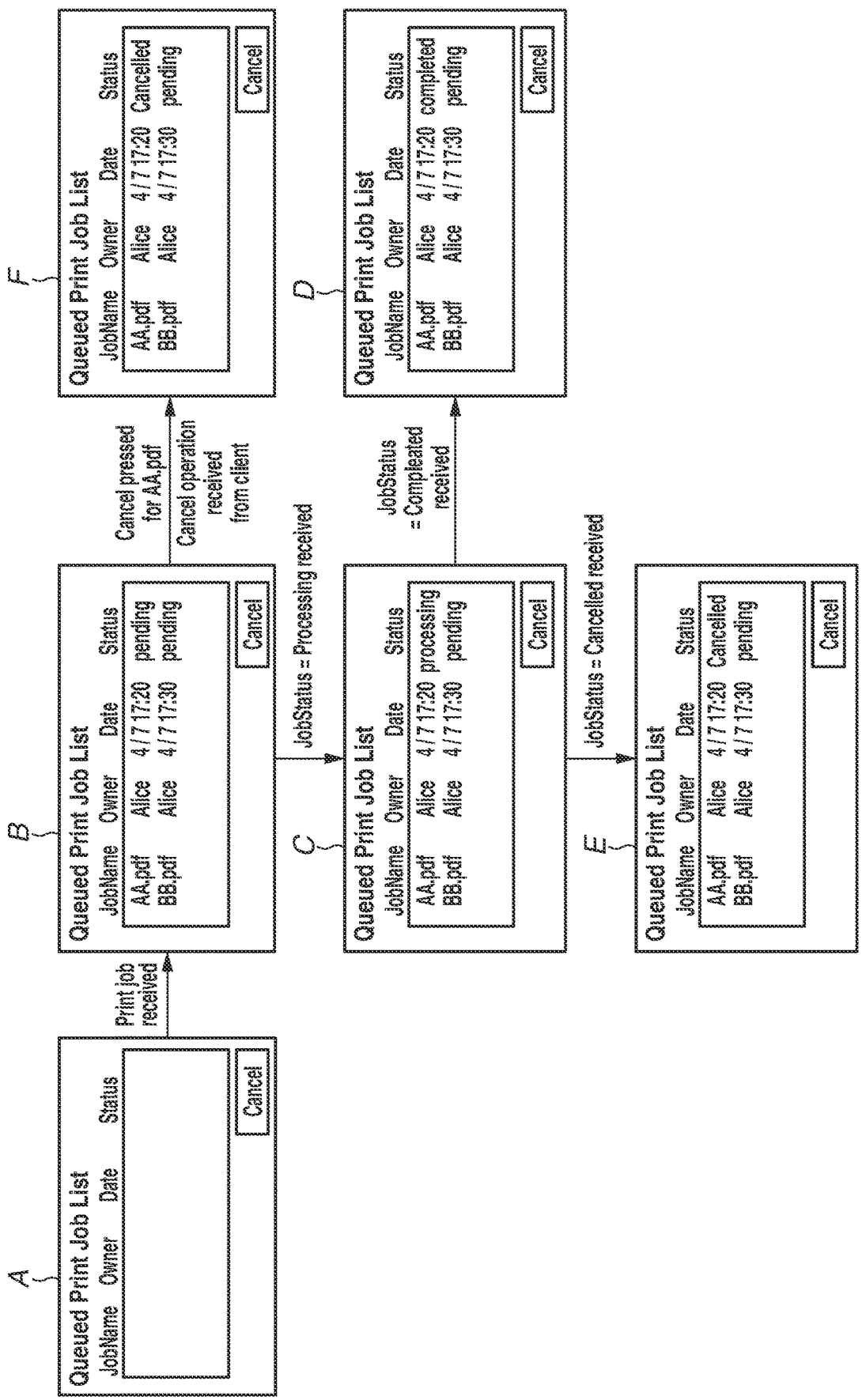

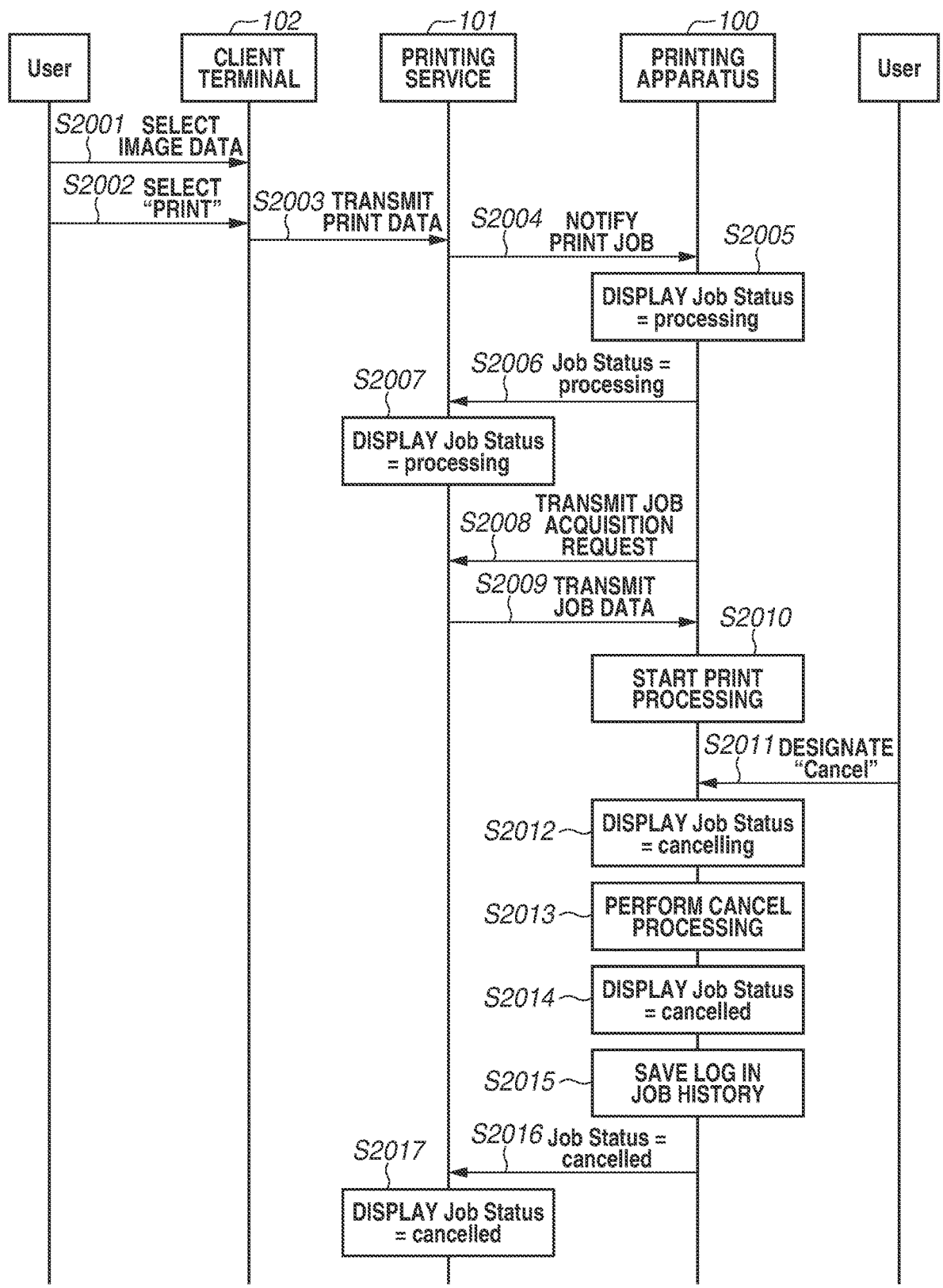

PRINTING APPARATUS CAPABLE OF CANCELLING PRINT JOB BASED ON USER OPERATION, CONTROL METHOD FOR PRINTING APPARATUS, AND STORAGE MEDIUM

BACKGROUND OF THE INVENTION

Field of the Invention

The present invention relates to a printing apparatus capable of cancelling a print job based on a user operation, a control method for the printing apparatus, and a storage medium.

Description of the Related Art

Among printing methods of recent years, a printing method, in which print data is downloaded from a printing service provided by a printing server on a network such as a cloud and printing is performed by a printing apparatus, have become widespread, in addition to a method of directly transmitting image data from a client to a printing apparatus. More specifically, a client terminal such as a mobile phone transmits print data to the printing service, and the printing service converts the print data into print data in a format of the printing apparatus. The printing apparatus then performs printing based on the converted print data downloaded from the printing service. For example, FIG. 1 illustrates a configuration including a printing apparatus 100, a printing service 101, and a client terminal 102. In such a configuration, the printing service may be either a cloud service or an on-premise service.

In a case where pull printing is performed in a configuration like the one illustrated in FIG. 1, for example, printing is performed as follows. A user comes in front of a printing apparatus, and logs into the printing apparatus, using a user ID and a password. The user then inquires of a printing service about whether there is a job for the user. When a job list of the user is displayed on an operation panel of the printing apparatus, based on a response from the printing service, the user selects a job that the user wants to print, and then selects a "print" button. The printing apparatus then acquires the corresponding job from the printing service, and performs printing for the job.

Meanwhile, in a case where the user wants to cancel printing, cancel is performed as follows. The user selects a job that the user wants to delete from the job list of the user, and provides a cancel instruction. The printing apparatus then transmits a cancel command to the printing service, and the printing service deletes the corresponding job (e.g., Japanese Patent Application Laid-Open No. 2017-170895).

As an example of a print system having such a network configuration, a configuration called Internet Printing Protocol Infrastructure (IPP-Infra) that uses the IPP for a printing protocol has been discussed in the Printer Working Group (PWG) 5100.18. The IPP is a printing protocol for exchanging print data between a computer at a remote site and a printing apparatus, by utilizing the Hypertext Transfer Protocol (HTTP) used in the Internet (see "http://ftp.pwg.org/pub/pwg/candidates/cs-ippinfra10-20150619-5100.18.pdf").

In the IPP-Infra, a Client for transmitting image data, an Infrastructure for holding image data, a Proxy for acquiring image data, and an Output Device for printing image data are defined. In this case, the Proxy and the Output Device may be a same terminal. Applying the configuration of the IPP-Infra to FIG. 1 results in a configuration in which the Infrastructure corresponds to the printing service 101, the Proxy and the Output Device correspond to the printing apparatus 100, and the Client corresponds to the client terminal 102.

SUMMARY OF THE INVENTION

According to embodiments of the present invention, a control method for a printing apparatus that receives print data from a printing service using Internet Printing Protocol and executes printing of the print data, includes displaying, on a display device, a list of print jobs held in the printing service, each of the print jobs being generated based on print data transmitted from a client terminal to the printing service, accepting a print instruction for a print job selected from the list displayed on the display device, sending, to the printing service, a request for transmitting print data corresponding to the print job of the accepted print instruction, and receiving the print data from the printing service, executing printing based on the print data received in response to the request triggered by the print instruction, using a printing device, and requesting the printing service to transmit print data corresponding to a print job selected from the list, in response to acceptance of a cancel instruction for the selected print job, and discarding the print data received from the printing service, without executing printing based on the print data.

Further features of the present invention will become apparent from the following description of exemplary embodiments with reference to the attached drawings.

BRIEF DESCRIPTION OF THE DRAWINGS

FIG. 3 is a table illustrating an example of operations defined by the Printer Working Group (PWG).

FIG. 13 (consisting of FIGS. 13A and 13B) illustrates screen examples of an operation panel of a printing apparatus according to the first exemplary embodiment.

FIG. 14 illustrates screen examples of a cloud operation panel according to the first exemplary embodiment.

FIG. 20 is a sequence diagram illustrating a job cancel operation according to the fourth exemplary embodiment.

DESCRIPTION OF THE EMBODIMENTS

In a case where a user wants to cancel (delete) a print job in a configuration of Internet Printing Protocol Infrastructure (IPP-Infra), there is such a restriction that a printing apparatus cannot transmit a job cancel command to a printing service in the IPP-Infra.

FIG. 3 is a table illustrating operations and subjects to deal with the respective operations. These operations and subjects are defined in the IPP-Infra specification. In this table, "MUST" indicates "must be implemented", "MUST NOT" indicates "must not be implemented", and "MAY" indicates "may either be implemented or not". For example, an operation listed as "Create-Job" indicates an operation for generating a print job, and indicates that this operation must be implemented in a Client and an Infrastructure, and must not be implemented in a Proxy.

According to this table, the Proxy corresponding to the printing apparatus is predefined as a subject that is not allowed to (MUST NOT) execute a Cancel-Job operation for performing job cancel.

According to the above-described predefinition, even if a user comes in front of the printing apparatus to cancel a job, the user has to cancel the job by activating a client terminal, or request an administrator of the printing service to cancel the job. Thus, the user needs to carry out additional work.

In view of at least one of the above-described issues, exemplary embodiments of the present invention provide a mechanism that can reduce work to be carried out by a user for deletion of a print job, in a printing apparatus that can receive print data from a printing service using the IPP and perform printing of the received print data. Exemplary embodiments of the present invention will be described below with reference to the drawings.

The following exemplary embodiments are not intended to limit the scope of the invention according to the claims, and not all of combinations of features to be described in the exemplary embodiments are necessary for a solution to the invention.

In a first exemplary embodiment, there will be described an example in which print data is acquired from a printing service on a cloud by using the IPP-Infra and the acquired print data is printed.

<Hardware Configuration>

Figure 1:
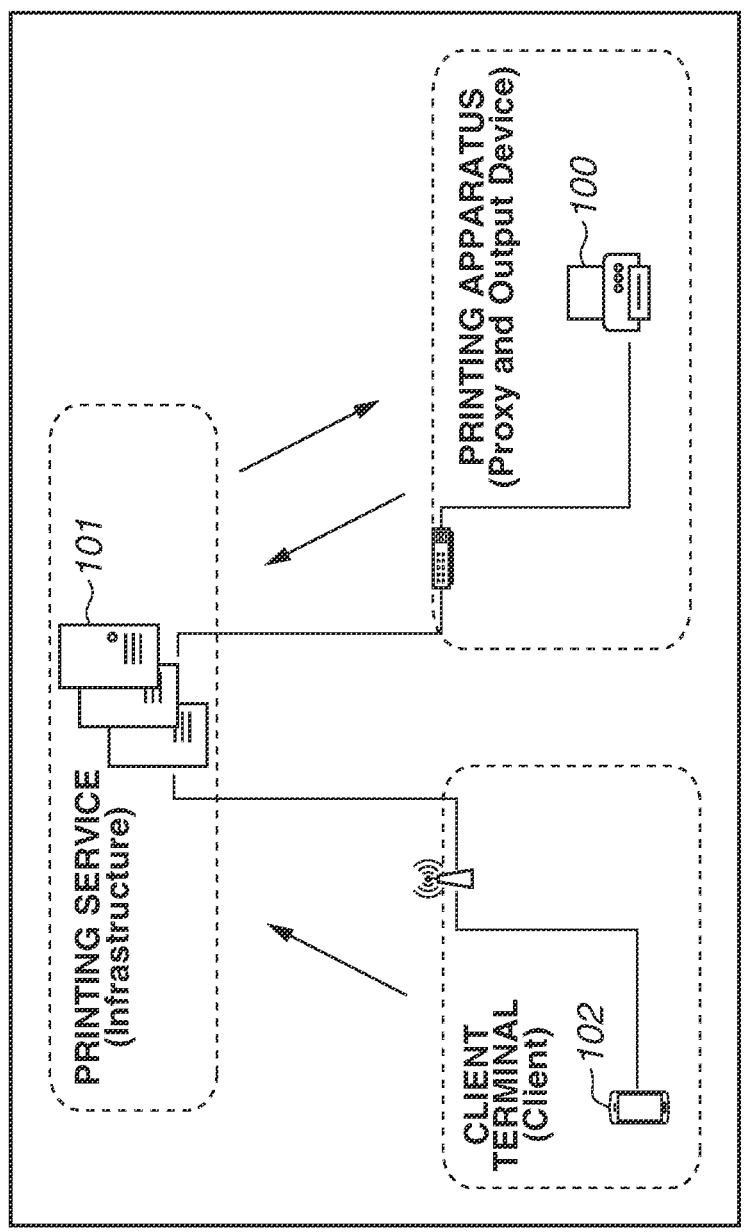
FIG. 1 is a diagram illustrating a configuration of a network according to an exemplary embodiment.

FIG. 1 illustrates an example of a cloud print system according to the present exemplary embodiment. The cloud print system includes a printing apparatus 100, a printing service 101 provided on the Internet, and a client terminal 102 serving as a terminal to be operated by a user. The printing apparatus 100 is registered in the printing service 101 beforehand by an owner of the printing apparatus 100. The user selects the printing apparatus 100 registered in the printing service 101 from the client terminal 102, and transmits print data to the printing service 101 via an access point or a portable base station. The printing apparatus 100 receives the print data transmitted by the user, via the printing service 101, and prints the received print data. Although not illustrated, the user can use the printing service 101 from a plurality of client terminals including not only the client terminal 102 but also a general-purpose personal computer and a smartphone. The printing apparatus 100 and the client terminal 102 are connected via the printing service 101 and the Internet. As described above, the configuration of the IPP-Infra is applied to the print system in FIG. 1. In this configuration, the printing apparatus 100 corresponds to an Output Device and a Proxy, the printing service 101 corresponds to an Infrastructure, and the client terminal 102 corresponds to a Client.

Figure 2:
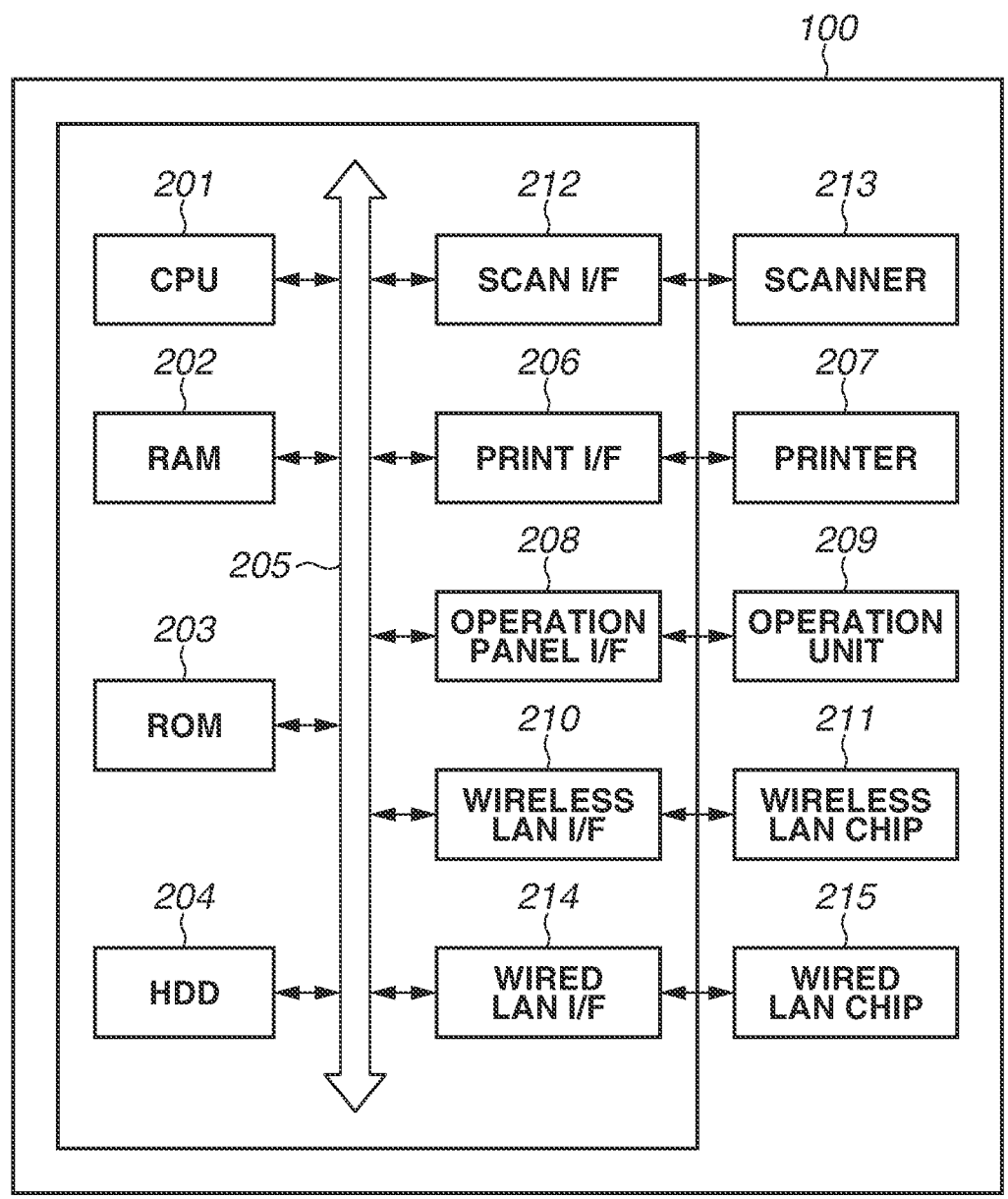
FIG. 2 is a block diagram illustrating a hardware configuration of a printing apparatus according to an exemplary embodiment.

Next, a configuration of the printing apparatus 100 will be described with reference to FIG. 2.

A central processing unit (CPU) 201 performs various kinds of processing for controlling the operation of the printing apparatus 100, by reading out a control program stored in a read only memory (ROM) 203. The ROM 203 stores the control program. A random access memory (RAM) 202 is used as a temporary storage area such as a main memory and a work area for the CPU 201. A hard disk drive (HDD) 204 stores various kinds of data including print data and scanned image data.

In the printing apparatus 100, the one CPU 201 executes processing illustrated in each of flowcharts to be described below, but other configurations may be adopted. For example, a plurality of processors and a plurality of memories can execute the processing illustrated in each of the flowcharts to be described below, in cooperation with each other.

In the printing apparatus 100, a printer 207 executes print processing, based on data such as print data received from an external apparatus and a scanned image generated by a scanner 213. The scanner 213 generates a scanned image by reading a document. The scanned image generated by the scanner 213 is printed by the printer 207 or stored into the HDD 204.

An operation unit 209 includes a liquid crystal display unit having a touch panel function and a keyboard, and displays various screens to be described below. The user can input an instruction and information into the printing apparatus 100 via the operation unit 209.

A wireless local area network (LAN) chip 211 implements communication with an external apparatus in wireless LAN communication, and has a connection type of wireless infrastructure or wireless direct, as a wireless LAN connection type.

A wired LAN interface (I/F) 214 executes wired LAN communication with an external apparatus such as a personal computer (PC) terminal, via a wired LAN chip 215.

<Software Configuration>

Figure 17:
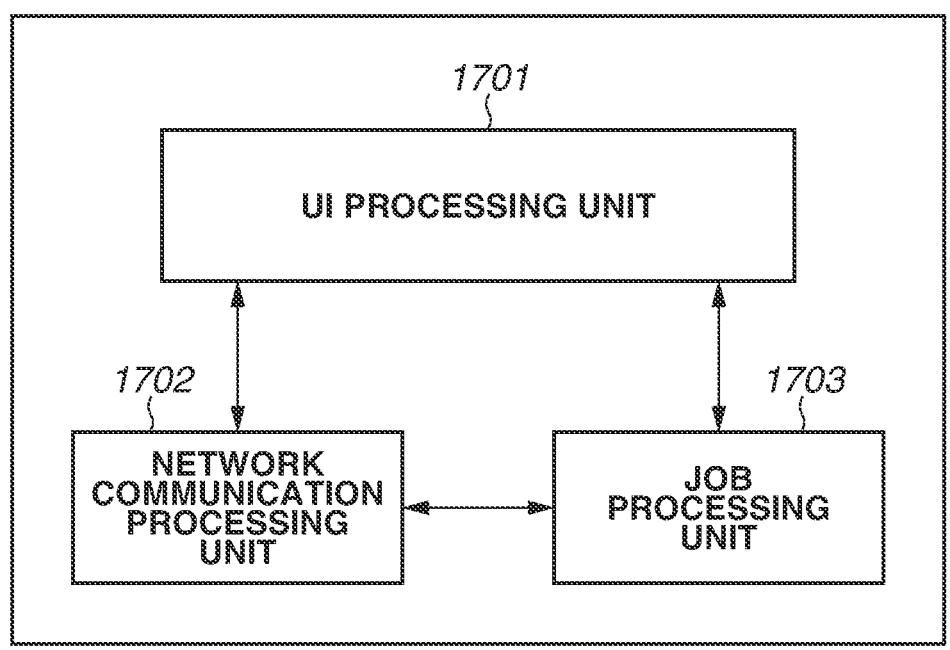
FIG. 17 is a block diagram illustrating a software configuration of the printing apparatus according to an exemplary embodiment.

FIG. 17 is a block diagram illustrating an example of a software configuration of the printing apparatus 100 in the present exemplary embodiment, in a simplified manner. The CPU 201 loads a program stored in the ROM 203 into the RAM 202 and executes the loaded program, so that the software configuration is implemented. A user interface (UI) processing unit 1701 generates an image for displaying a job list screen illustrated in FIG. 14, or a job history screen. Further, the UI processing unit 1701 notifies a job processing unit 1703 and a network communication processing unit 1702 of an event representing the pressing of a "Print" button or a "Cancel" button by the user. Furthermore, the UI processing unit 1701 receives a notification about a change in job status from the job processing unit 1703, and reflects the received notification in the job list screen or the job history screen. The network communication processing unit 1702 performs control for network communication such as the IPP with an external terminal such as a server providing the printing service 101, via a wireless LAN or wired LAN. For example, the network communication processing unit 1702 acquires a print job from the printing service 101, and performs processing for transferring received image data to the job processing unit 1703. The job processing unit 1703 interprets the received image data and executes print processing. Further, the job processing unit 1703 notifies the UI processing unit 1701 of an event representing completion of a job or an error.

The client terminal 102 includes a web browser for transmitting a Hypertext Markup Language (HTML) request and displaying a screen based on an HTML response received in response to the request, although the web browser is not illustrated. Further, the printing service 101 has a function of registering the printing apparatus 100. The printing service 101 also has a function of converting print data designated from the client terminal 102 into a print job, and providing the print job to the printing apparatus 100 selected from a plurality of printing apparatuses 100. Further, the printing service 101 has a web server function, and provides a user interface for referring to and setting a job status or a printing-service load status saved in the printing service 101, via the web browser. These functions also are provided by a software configuration, and a CPU loads a program stored in a ROM into a RAM and executes the loaded program, so that the software configuration is implemented.

<Job Input Procedure>

Figure 4:
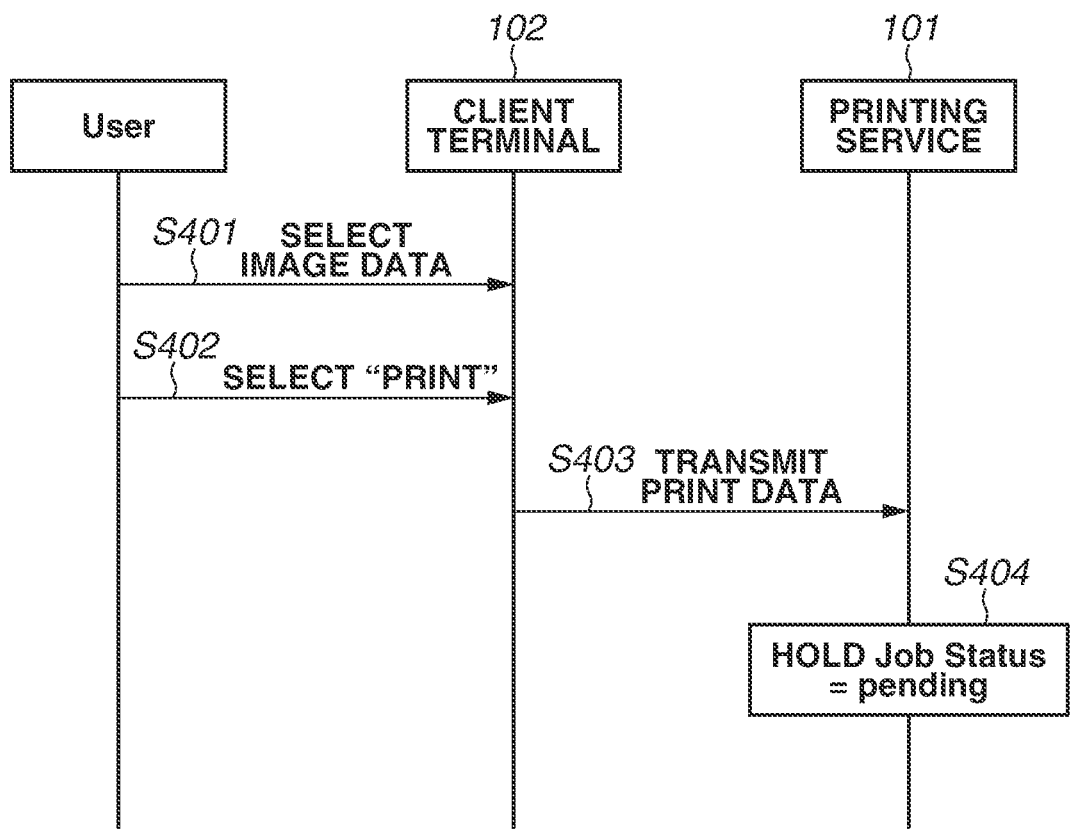
FIG. 4 is a sequence diagram illustrating print data input operation according to a first exemplary embodiment.

FIG. 4 is a sequence diagram illustrating a sequence in which print data is input from the client terminal 102 to the printing service 101. The client terminal 102 is installed with a web browser corresponding to the printing service 101, so that the user can select a printing apparatus registered in the printing service 101 from a printing menu of the web browser. In step S401, the user selects image data that the user wants to print, from the client terminal 102. In step S402, the user selects "Print" in a property screen of the image data. In step S403, the client terminal 201 transmits the print data to the printing service 101. In the IPP, print data is transmitted through use of a Print-Job operation or a Create-Job operation. A requesting-user-name attribute of this operation includes user information for identifying the user operating the client terminal 102. Thus, the printing service 101 can identify which user has made a printing request from the client terminal 102. In step S404, upon receiving the print data, the printing service 101 generates a print job, and saves the generated print job in a storage area within the printing service 101, so that the processing status of the job is held in a pending (waiting) state.

FIG. 14 illustrates examples of a screen that displays a processing status in the printing service 101. As described above, the web server is mounted in the printing service 101. An administrator logs into from the web server, so that the administrator can refer to and set a job status and a printing-service load status saved in the printing service 101, via the browser. Upon receiving a print job from the client terminal 102, the web server shifts a state from a state A where no print job is present to a state B where two print jobs are received from a client. In the state B, a time at which the job is received is displayed in a Date area, a job status is displayed in a Status area, a requesting-user-name attribute that is an IPP attribute included in the job is displayed in an Owner area, and a job-name attribute that is an IPP attribute is displayed in a JobName area.

<Job List Display Procedure>

Figure 10:
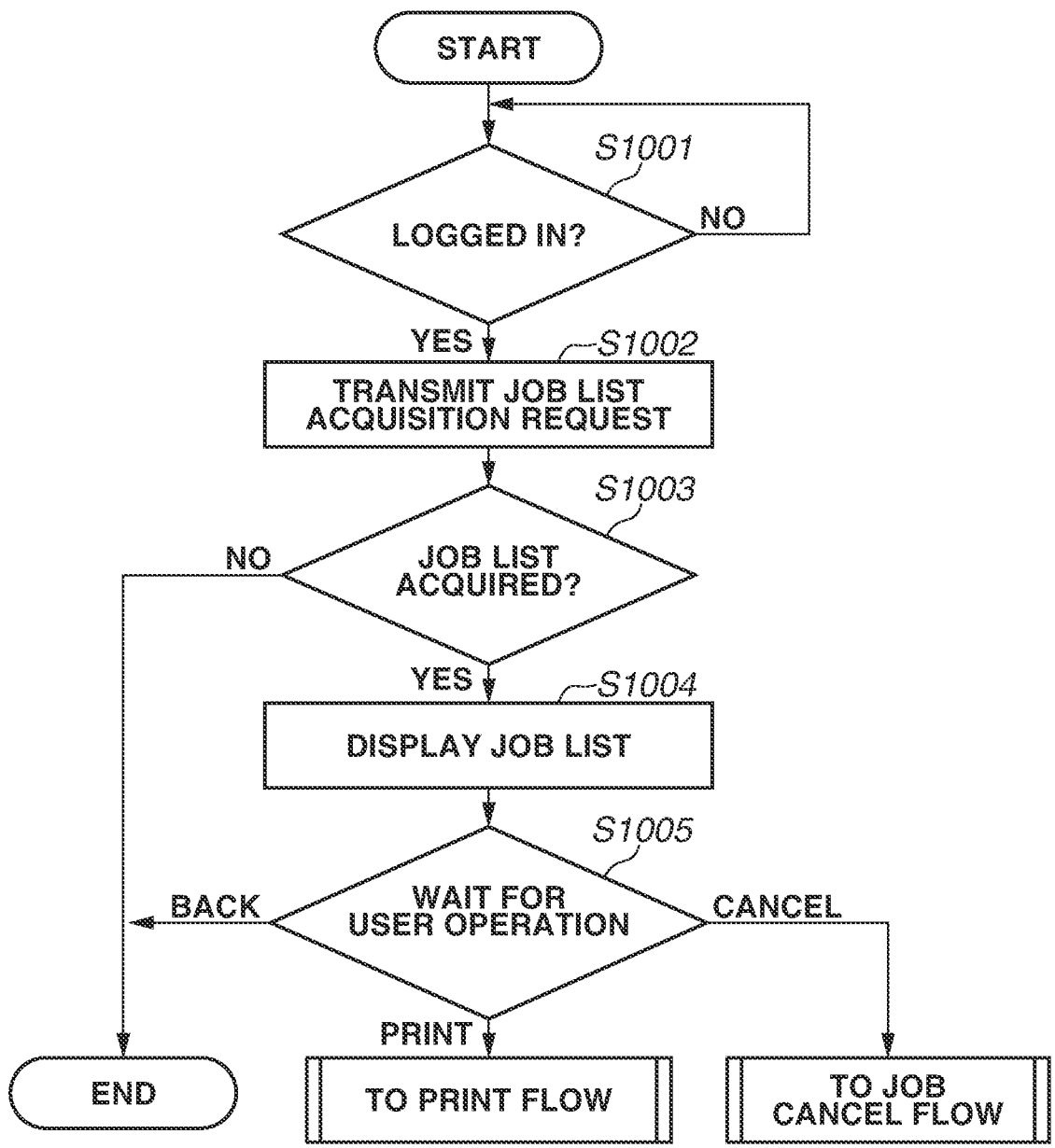
FIG. 10 is a flowchart illustrating a job list display operation according to the first exemplary embodiment.

Next, processing of displaying a print job list saved in the printing service 101 based on user operations on the printing apparatus 100 will be described with reference to a flowchart in FIG. 10. First, in step S1001, whether the user has logged into the printing apparatus 100 is determined. If the user has logged into the printing apparatus 100 (YES in step S1001), the processing proceeds to step S1002. The log in is performed, for example, by inputting a user ID and a password from the operation unit 209 of the printing apparatus 100 as in a screen A illustrated in FIG. 13 (consisting of FIGS. 13A and 13B), or touching a card storing a user ID and a password on the printing apparatus 100. If the login is successful, operation icons that the user is permitted to use appear on the operation unit 209, as in a screen B illustrated in FIG. 13, so that the user can implement a desired operation by selecting an icon. The user can operate cloud printing of the present exemplary embodiment by selecting a "Cloud PRINT" icon in the screen B illustrated in FIG. 13. When the "Cloud PRINT" icon is pressed, the screen B transitions to a job list screen indicated as a screen C illustrated in FIG. 13. In this case, a print job list of the logged-in user is displayed.

In step S1002, internally, the CPU 201 of the printing apparatus 100 transmits a job list acquisition request to the printing service 101. The job list acquisition request is implemented by a Get-Jobs operation or a Get-Documents operation of the PP. In this operation, a my-jobs attribute is set to True, and user information of the login user is stored in a requesting-user-name attribute and a requesting-user-uri attribute. Only a print job having user-attribute values matching with the values of these attributes among print jobs saved in the printing service 101 is transmitted from the printing service 101 to the printing apparatus 100.

In step S1003, whether the print job list is acquired is determined. If the print job list is successfully acquired (YES in step S1003), the processing proceeds to step S1004. In step S1004, the CPU 201 displays the acquired job list on the operation unit 209 as in the screen C illustrated in FIG. 13. At this time, the user currently logging in the printing apparatus 100 is "Alice", and the job list of this user is displayed. Subsequently, in step S1005, the CPU 201 enters a state for waiting an operation from the user. If the user selects a job and then selects "Print" ("PRINT" in step S1005), the processing proceeds to a flowchart in FIG. 11. If the user selects a job and then selects "Cancel" ("CANCEL" in step S1005), the processing proceeds to a flowchart in FIG. 12. Meanwhile, if no print job list is transmitted because no print job corresponding to the user having logged into the printing apparatus 100 is registered in the printing service 101 (NO in step S1003), the processing ends. The processing also ends, if the user selects "Back" in the job list screen indicated as the screen C illustrated in FIG. 13 ("BACK" in step S1005).

<Printing Procedure>

Figure 5:
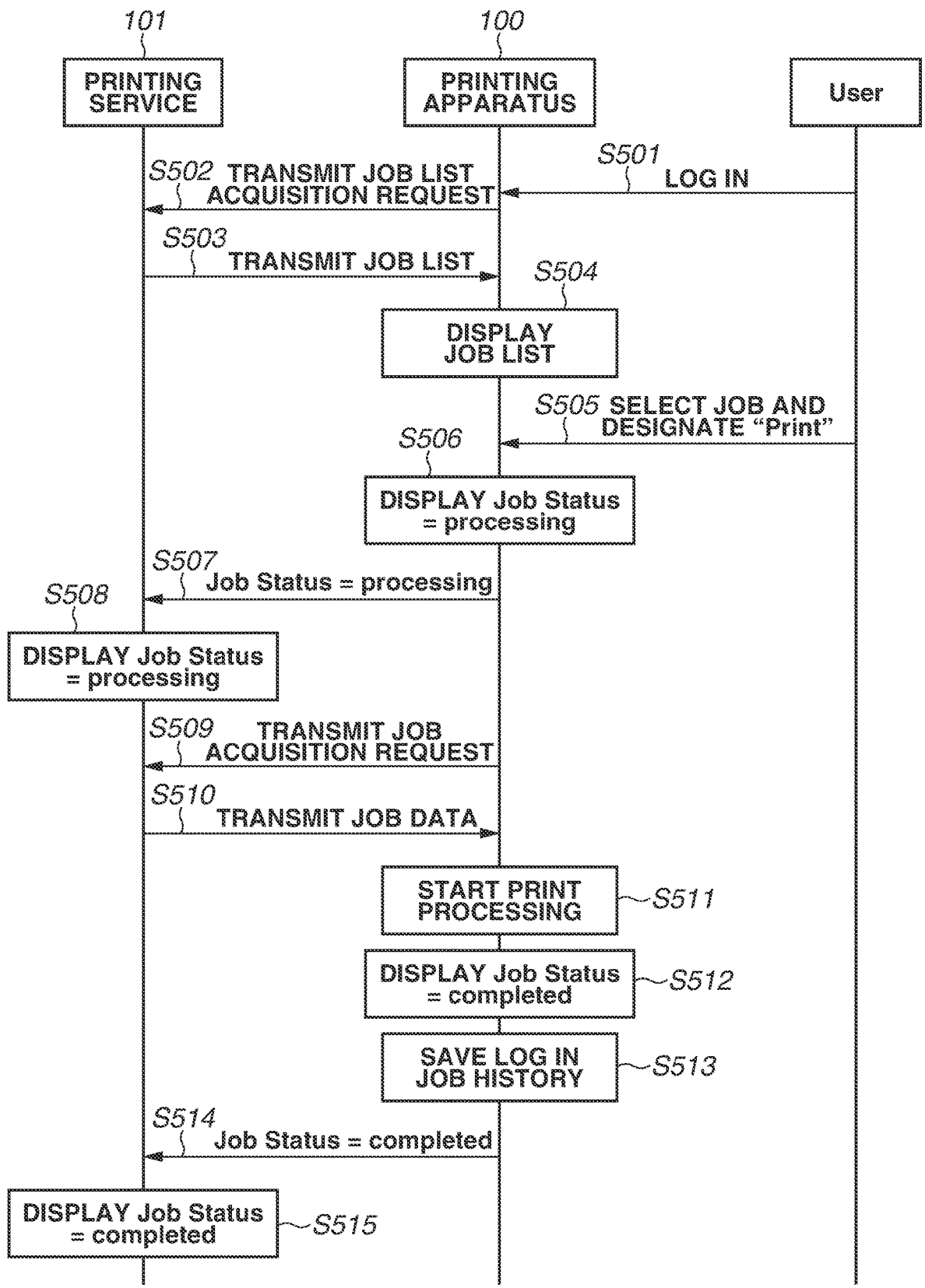
FIG. 5 is a sequence diagram illustrating a job printing operation according to the first exemplary embodiment.

FIG. 5 is a sequence diagram illustrating a sequence in which the printing apparatus 100 acquires a job from the printing service 101 to perform printing.

In step S501, the user logs into the printing apparatus 100. In step S502, when the user selects "Cloud PRINT" from a menu screen indicated as the screen B illustrated in FIG. 13, the printing apparatus 100 transmits a job list acquisition request to the printing service 101. In step S503, the printing service 101 transmits a list of print jobs associated with the user having logged into the printing apparatus 100 to the printing apparatus 100, as a response to the received job list acquisition request. In step S504, the printing apparatus 100 displays the job list screen indicated as the screen C illustrated in FIG. 13, based on the received information. As will be described below, the job list screen indicated as the screen C illustrated in FIG. 13 is a screen in which a print instruction and a cancel instruction for a print job from the user can be accepted. The steps to this point are implemented by performing step S1001 to step S1004 in FIG. 10 described above.

In step S505, the user presses "Print", in a state where a job to be printed is selected from the job list screen indicated as the screen C illustrated in FIG. 13. Then, in step S506, the printing apparatus 100 changes the status of the corresponding job in the job list screen to a "processing" state. A screen that appears at this moment is a screen G illustrated in FIG. 13. A among the two print jobs, the status of only a print job corresponding to a JobName of "AA.pdf" has changed from "pending" to "processing".

Next, in step S507, the printing apparatus 100 transmits a job-status update notification to the printing service 101 to set Job Status=processing (in processing). This operation is implemented by transmitting an Update-Job-Status operation. In step S508, upon receiving this operation, the printing service 101 changes the status of the corresponding job to "processing" as in a screen C illustrated in FIG. 14.

Subsequently, in step S509, the printing apparatus 100 transmits a job acquisition request to the printing service 101 to acquire the print job selected by the user for printing. In the IPP, the job acquisition request is performed by using operations such as Fetch-Job, Acknowledge-Job, Fetch-Document, and Acknowledge-Document operations.

In step S510, upon receiving the job acquisition request, the printing service 101 transmits job data to the printing apparatus 100. In step S511, the printing apparatus 100 starts print processing based on the received print data. In step S512, in a case where the print processing is normally completed, the printing apparatus 100 changes the status of the corresponding job in the job list screen to "completed" (completion) as in a screen H illustrated in FIG. 13. Further, in step S513, the printing apparatus 100 saves a time at which the print processing is completed, a result, a user name, and a job name, as a job history, and updates the job history screen as in a screen I illustrated in FIG. 13.

Finally, in step S514, the printing apparatus 100 transmits an Update-Job-Status operation to the printing service 101 to set Job Status=completed. In step S515, upon receiving this operation, the printing service 101 changes the status to "completed" as in a screen D illustrated in FIG. 14.

The printing apparatus 100 acquires the print data transmitted from the client terminal 102 to the printing service 101 and can print the acquired print data, by the above-described processing.

<Job Cancel Procedure According to Exemplary Embodiment>

Figure 6:
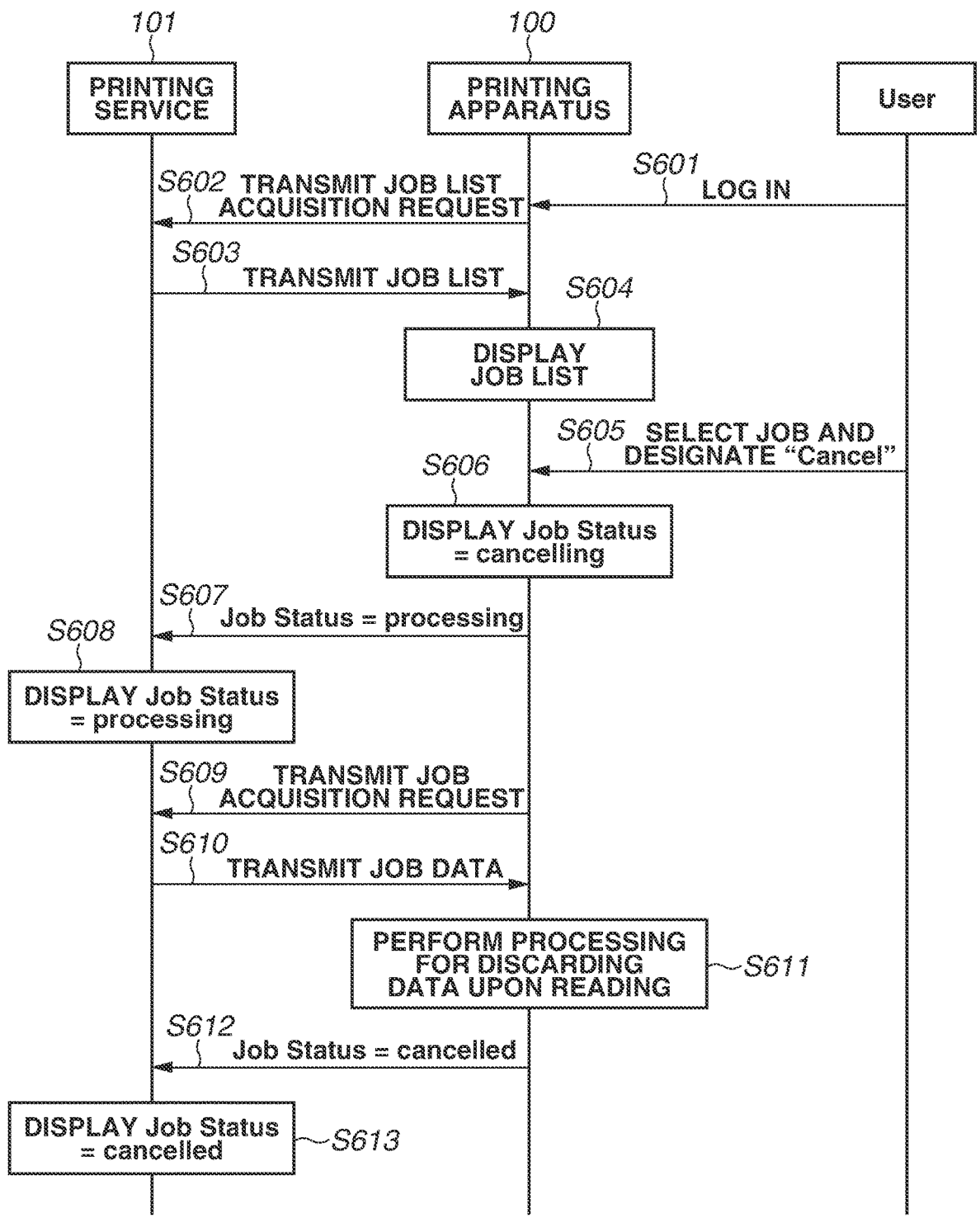
FIG. 6 is a sequence diagram illustrating a job cancel operation according to the first exemplary embodiment.

FIG. 6 is a sequence diagram illustrating a sequence in which a print job registered in the printing service 101 is cancelled (deleted) without starting printing by the printing apparatus 100. Processing performed in step S601 to step S604 in FIG. 6 is similar to that performed in step S501 to step S504 in FIG. 5, and therefore will not be described.

In step S605, the user presses "Cancel" in a state where at least one job is selected from the job list screen indicated as the screen C illustrated in FIG. 13. Then, in step S606, the printing apparatus 100 changes the processing status of the corresponding job in the job list screen to "cancelling" (being cancelled). A screen that appears at this moment is the screen D illustrated in FIG. 13. Among the two print jobs, the status of only the print job corresponding to the JobName of "AA.pdf" has changed from "pending" to "cancelling".

Next, in step S607, the printing apparatus 100 transmits an Update-Job-Status operation to the printing service 101 to set Job Status=processing. In step S608, upon receiving this operation, the printing service 101 changes the status of the corresponding job to a "processing" state as in the screen C illustrated in FIG. 14.

Subsequently, in step S609, the printing apparatus 100 transmits a job acquisition request to the printing service 101 to acquire print data corresponding to the print job selected as a cancel target. In the IPP, the job acquisition request is performed using operations such as Fetch-Job, Acknowledge-Job, Fetch-Document, and Acknowledge-Document operations.

In step S610, upon receiving the job acquisition request, the printing service 101 transmits job data to the printing apparatus 100. In step S611, the printing apparatus 100 discards, in a network layer, the received job data upon reading, without executing print processing based on the received print data. Internally, the printing apparatus 100 discards the image data received by the network communication processing unit 1702, and does not transfer the image data to the job processing unit 1703. Subsequently, the printing apparatus 100 deletes the corresponding job from the job list screen as in a screen E illustrated in FIG. 13. In addition, at this moment, no trace of print processing for the job remains in a job history as in a screen F illustrated in FIG. 13.

Finally, in step S612, the printing apparatus 100 transmits an Update-Job-Status operation to the printing service 101 to set Job Status=cancelled (cancel completed). In step S613, upon receiving this operation, the printing service 101 changes the status of the corresponding job to "Cancelled" as in a screen E illustrated in FIG. 14.

As described above, in a case where cancel is selected before execution of printing in the printing apparatus 100, the printing apparatus 100 can perform pseudo cancel of a job on the printing service 101 by acquiring the corresponding job from the printing service 101 and internally discarding the acquired job upon reading. Therefore, even with a protocol that prohibits a Cancel-Job operation in a printing apparatus as in the IPP-Infra, it is possible to perform cancel in an operation procedure similar to a procedure using a protocol that permits a cancel operation.

<Other Job Cancel Procedures>

Figure 7:
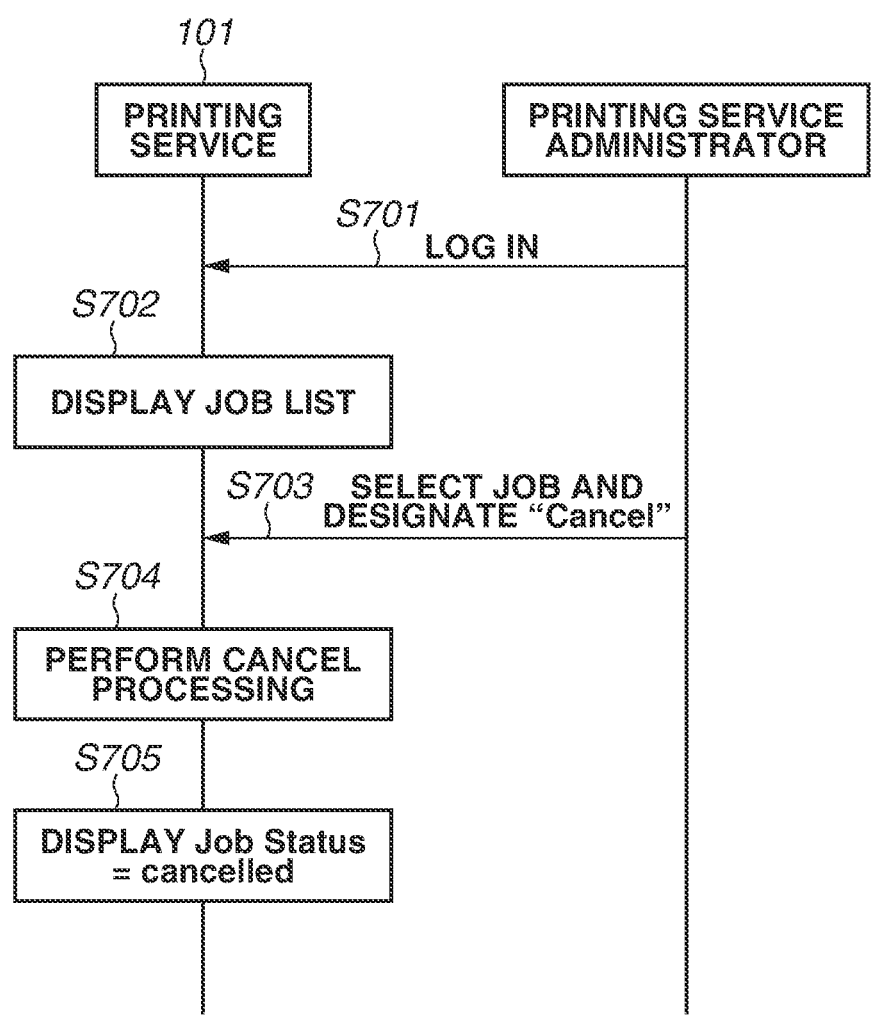
FIG. 7 is a sequence diagram illustrating a job cancel operation to be performed by a cloud administrator according to the first exemplary embodiment.

There is a method for a job cancel procedure other than the job cancel procedure according to the present exemplary embodiment. For example, there is a method illustrated in FIG. 7. According to this method, the administrator of the printing service 101 accesses the printing service 101, and deletes a job saved in the printing service 101 by directly designating the job. In this case, any user having administrator authority can perform operations.

Specifically, in step S701, the administrator logs into the web server of the printing service 101, using a web browser of an apparatus such as a PC. In step S702, the printing service 101 displays a job list. A screen that appears at this moment is a screen B illustrated in FIG. 14. In step S703, the administrator selects a job as a cancel target from the job list displayed as in the screen B illustrated in FIG. 14, and presses "Cancel". Then, in step S704, cancel processing is performed on the printing service 101. Subsequently, in step S705, the printing service 101 changes the status of the corresponding job to "Cancelled" as in a screen F illustrated in FIG. 14.

Figure 8:
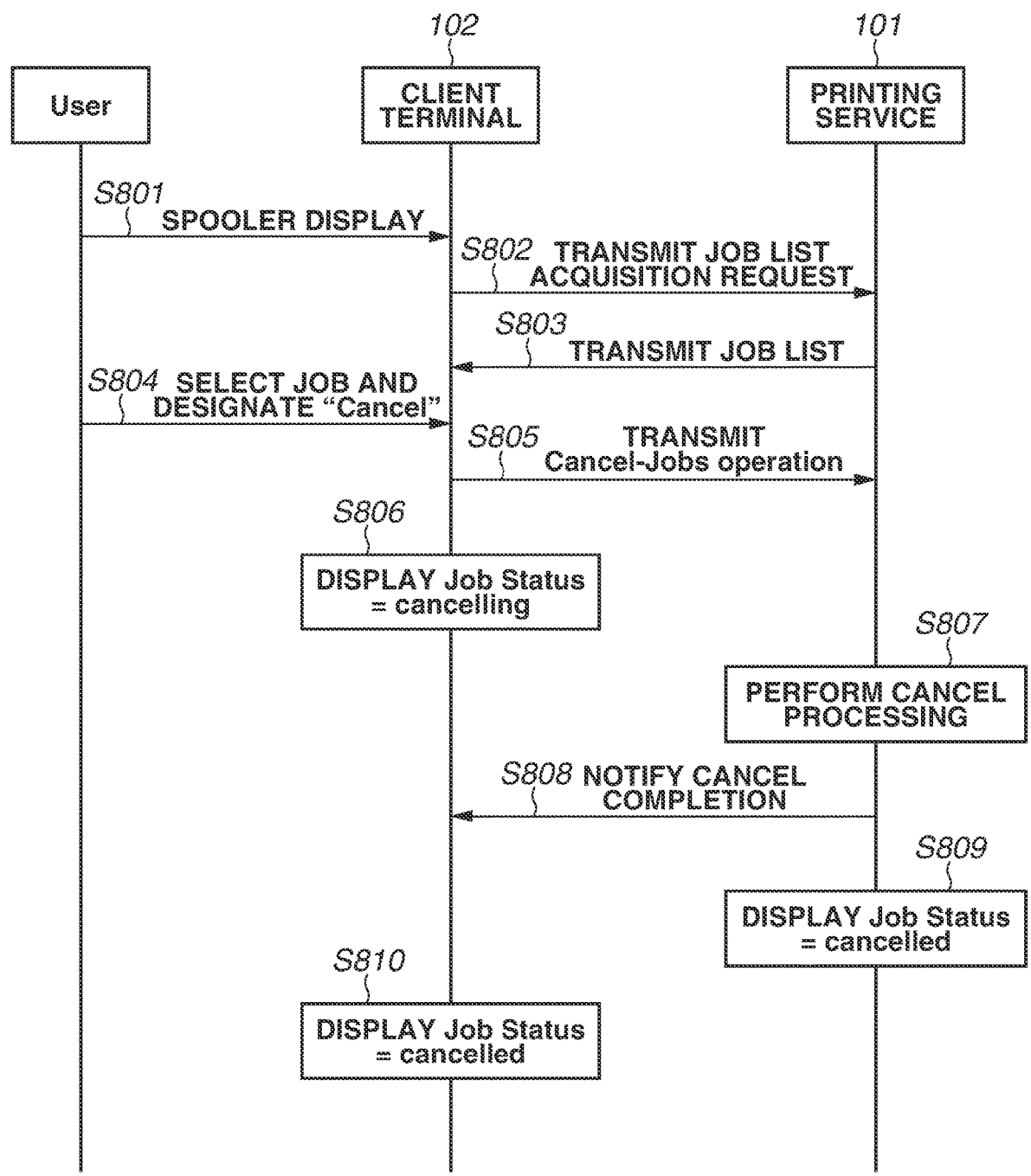
FIG. 8 is a sequence diagram illustrating a job cancel operation from a client terminal according to the first exemplary embodiment.

There is also another method for cancelling a job from the client terminal 102 as illustrated in FIG. 8. More specifically, in step S801, step 802, and step 803, a job status saved in the printing service 101 is checked from the client terminal 102 operated by the user who has input a job, by using software such as a spooler. In step S804, the user selects a job that the user wants to cancel, and provides a cancel instruction. In step S805, the client terminal 102 transmits a Cancel-Jobs operation to the printing service 101. In step S806, the client terminal 102 changes the status of the corresponding job to "cancelling". In step S807, the printing service 101 performs cancel processing. In step S808, upon completion of the cancel processing, the printing service 101 transmits a notification of cancel completion to the client terminal 102. In step S809, the printing service 101 changes the status of the corresponding job to "cancelled" when the cancel processing is completed in step S807. In step S810, upon receiving the notification of cancel completion, the client terminal 102 changes the status of the corresponding job to "cancelled". As described above, the cancel operation from a client is permitted in the predefinition of the IPP-Infra, and this operation can be performed. In addition, instead of the Cancel-Jobs operation, cancel-related operations such as a Cancel-My-Jobs operation and a Cancel-Job operation may be used. Upon receiving the cancel operation, the printing service 101 changes the status of the corresponding job to a "Cancelled" state as in the screen F illustrated in FIG. 14.

<Procedure for Cancelling Job after Starting Print Processing>

Figure 9:
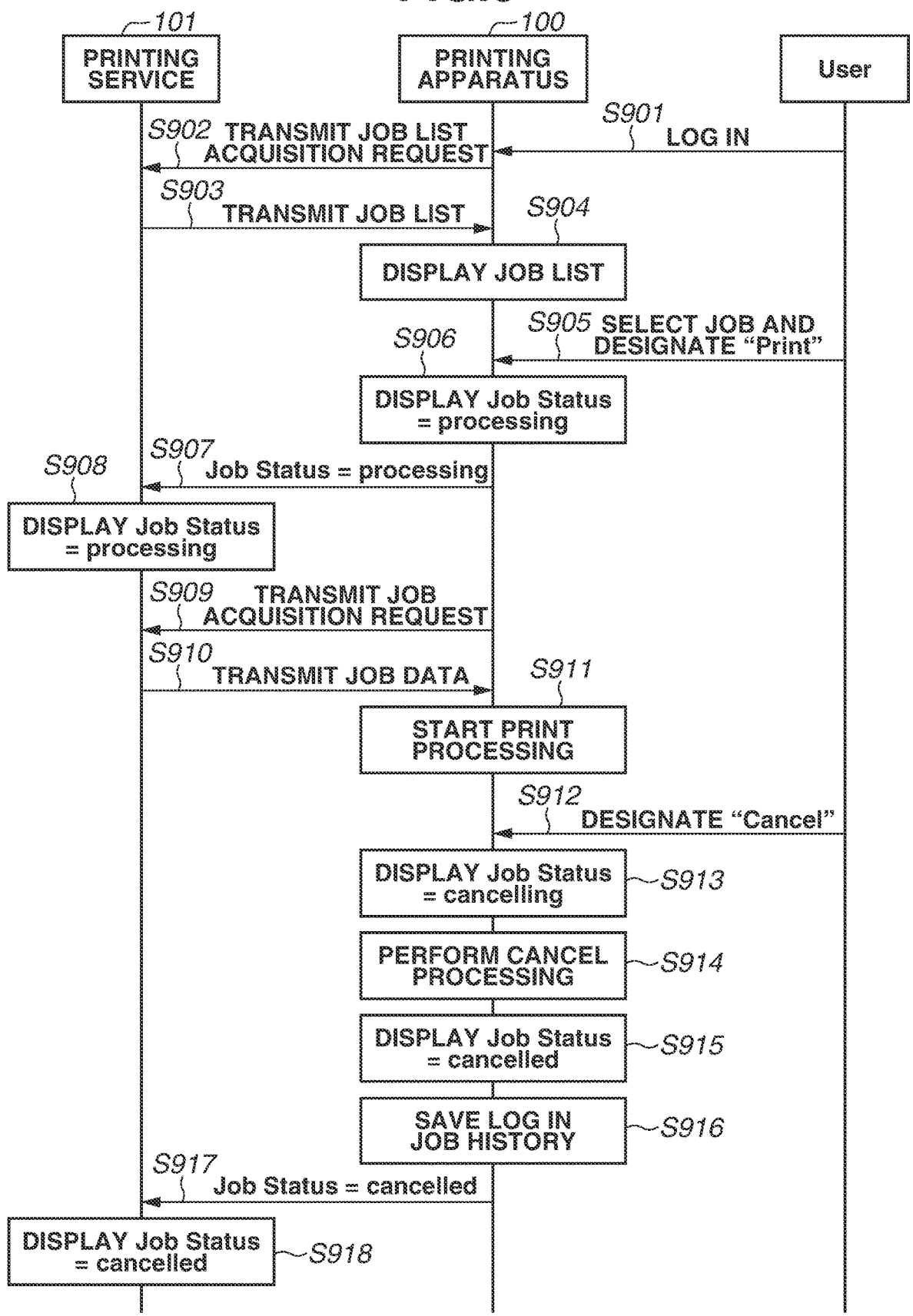
FIG. 9 is a sequence diagram illustrating a job cancel operation during a job printing operation according to the first exemplary embodiment.

The example in which the print job saved in the printing service 101 is cancelled without starting printing is described above with reference to FIG. 6 to FIG. 8. FIG. 9 illustrates a sequence for performing cancel (stop) during print processing after starting printing by the printing apparatus 100. Processing performed in step S901 to step S911 up to start of printing is similar to that performed in step S501 to step S511 in FIG. 5, and therefore will not be described.

In step S911, the printing apparatus 100 starts print processing. In step S912, the user selects "Cancel" from the operation unit 209, for a job in processing for printing as displayed in the screen G illustrated in FIG. 13. In step S913, the printing apparatus 100 changes the status of the corresponding job to a "cancelling" state. In step S914, the printing apparatus 100 performs cancel processing. Internally, the job processing unit 1703 executes job cancel, for image data transferred from the network communication processing unit 1702 to the job processing unit 1703. In step S915, upon completion of the cancel processing, the printing apparatus 100 changes the status of the corresponding job to a "cancelled" state as in a screen J illustrated in FIG. 13. Further, in step S916, the printing apparatus 100 saves a time at which the cancel processing is completed, a result, a user name, and a job name, as a job history, and updates the job history screen as in a screen K illustrated in FIG. 13.

Finally, in step S917, the printing apparatus 100 transmits an Update-Job-Status operation to the printing service 101 to set Job Status=cancelled. In step S918, upon receiving this operation, the printing service 101 changes the status to "Cancelled" as in the screen E illustrated in FIG. 14.

In this operation, there is a case where the print processing for some sheets is completed and then the sheets are discharged before completion of cancel. There are also some issues including an issue in which a cancel record remains in a job history and an issue in which simultaneously cancelling a plurality of jobs takes time and labor. Therefore, this operation can be inappropriate in a case where deletion of a job on the printing service 101 side is desired.

Hence, according to the present exemplary embodiment, the method described above with reference to FIG. 6 is employed, so that it is possible to cancel the job on the printing service 101 from the printing apparatus 100, without causing the above-described issues.

<Flow of Print job Execution in Printing Apparatus 100>

Figure 11:
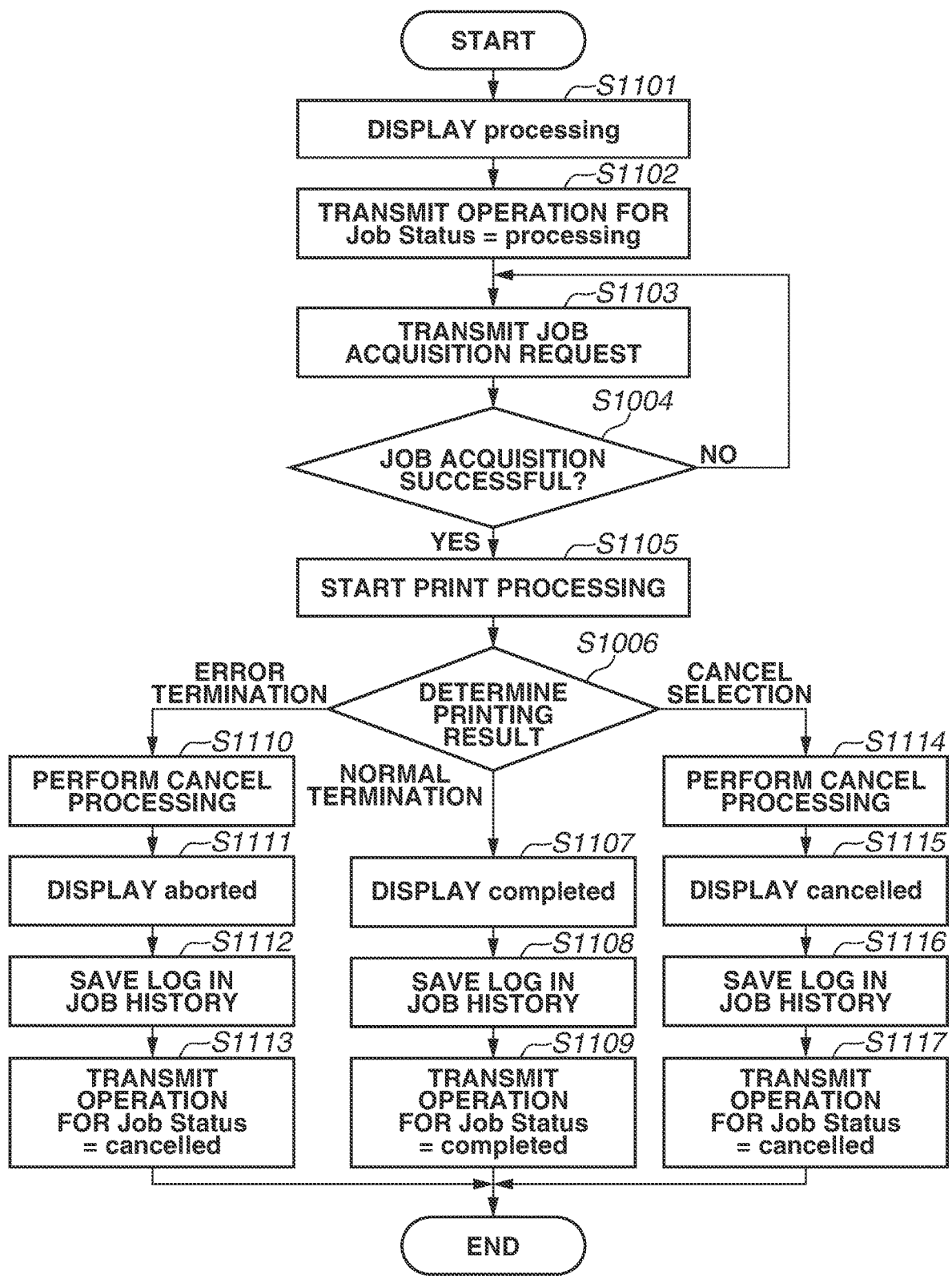
FIG. 11 is a flowchart illustrating a job printing operation according to the first exemplary embodiment.

Processing of flowchart to be performed by the printing apparatus 100 in executing a print job selected by the user from the job list screen indicated as the screen C illustrated in FIG. 13 will be described with reference to FIG. 11.

In step S1101, upon detecting "Print" being selected from the job list screen, the CPU 201 changes the status of the corresponding job in the job list screen to a "processing" state (refer to the screen G illustrated in FIG. 13). Subsequently, in step S1102, the CPU 201 transmits an Update-Job-Status operation to the printing service 101 to set Job Status=processing.

Next, in step S1103, the CPU 201 transmits a job acquisition request to the printing service 101. In the IPP, the job acquisition request is performed by using operations such as Fetch-Job, Acknowledge-Job, Fetch-Document, and Acknowledge-Document operations. In step S1104, the CPU 201 determines whether job acquisition is successful. If the job acquisition fails due to instability or disconnection of a line (NO in step S1104), the CPU 201 retransmits the job acquisition request. Although not illustrated, in a case where the job acquisition is unsuccessful even after the job acquisition request is transmitted a predetermined number of times, the processing of this flowchart ends.

If the job acquisition is successful (YES in step S1104), the processing proceeds to step S1105. In step S1105, the CPU 201 starts print processing. Internally, image data is transferred from the network communication processing unit 1702 to the job processing unit 1703, and the job processing unit 1703 starts the print processing.

In step S1106, the CPU 201 determines a printing result. If the print processing is normally completed ("NORMAL TERMINATION" in step S1106), the processing proceeds to step S1107. In step S1107, the CPU 201 changes the status of the corresponding job in the job list screen to "completed" as in the screen H illustrated in FIG. 13. Further, in step S1108, the CPU 201 saves a time at which the print processing is completed, a result, a user name, and a job name, as a log. Subsequently, in step S1109, the CPU 201 transmits an Update-Job-Status operation to the printing service 101 to set Job Status=completed.

In step S1106, if the CPU 201 detects "Cancel" being selected by the user from the operation unit 209 for a job in processing for printing in the screen G illustrated in FIG. 13 ("CANCEL SELECTION" in step S1106), the processing proceeds to step S1114. In step S1114, the CPU 201 executes cancel processing for the corresponding job. Internally, for image data transferred from the network communication processing unit 1702 to the job processing unit 1703, the job processing unit 1703 executes job cancel. In step S1115, the CPU 201 changes the status of the corresponding job to a "cancelled" state as in the screen J illustrated in FIG. 13. Further, in step S1116, the CPU 201 records a time at which the cancel processing is completed, a result, a user name, and a job name, in a job history, as a log. Subsequently, in step S1117, the CPU 201 transmits an Update-Job-Status operation to the printing service 101 to set Job Status=cancelled.

In step S1106, if the print processing is terminated abnormally because of, for example, an occurrence of a rendering error during the print processing ("ERROR TERMINATION" in step S1106), the processing proceeds to step S1110. In step S1110, the CPU 201 performs error processing. In step S1111, the CPU 201 changes the status of the corresponding job to an "aborted" state as in a screen L illustrated in FIG. 13. Further, in step S1112, the CPU 201 records, in a job history, as a log, a time at which the cancel processing is completed, a result, a user name, and a job name. Subsequently, in step S1113, the CPU 201 transmits an Update-Job-Status operation to the printing service 101 to set Job Status=cancelled. In this case, the error is also saved in a history as a log in the printing service 101.

<Flow of Print Job Cancel in Printing Apparatus 100>

Figure 12:
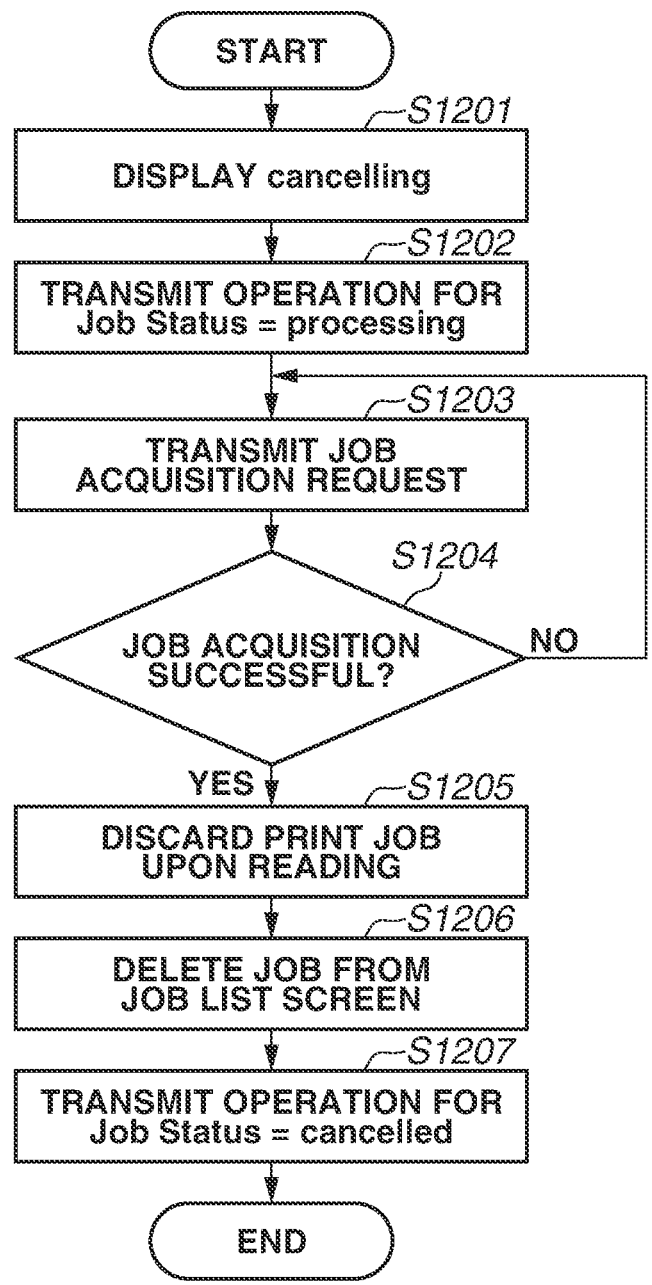
FIG. 12 is a flowchart illustrating a job cancel operation according to the first exemplary embodiment.

Processing of flowchart to be performed by the printing apparatus 100 in cancelling a print job selected by the user from the job list screen indicated as the screen C illustrated in FIG. 13 will be described with reference to FIG. 12.

First, in step S1201, upon detecting "Cancel" being selected from the job list screen, the CPU 201 changes the status of the corresponding job in the job list screen to "cancelling" (refer to the screen D illustrated in FIG. 13). In the selection of a job to be cancelled from the job list screen, one job may be selected or a plurality of jobs may be selected at a time.

Next, in step S1202, the CPU 201 transmits an Update-Job-Status operation to the printing service 101 to set Job Status=processing. Next, in step S1203, the CPU 201 transmits a job acquisition request for the job to be cancelled, to the printing service 101. In the IPP, the job acquisition request is performed by using operations such as Fetch-Job, Acknowledge-Job, Fetch-Document, and Acknowledge-Document operations. In step S1204, the CPU 201 determines whether job acquisition is successful. If the job acquisition fails due to instability or disconnection of a line (NO in step S1204), the CPU 201 retransmits the job acquisition request. Although not illustrated, in a case where the job acquisition is unsuccessful even after the job acquisition request is transmitted a predetermined number of times, the processing of this flowchart ends.

If the job acquisition is successful (YES in step S1204), the processing proceeds to step S1205. In step S1205, the CPU 201 discards the job upon reading in a network layer, without performing print processing for received image data. Internally, the network communication processing unit 1702 deletes the received image data. Accordingly, the image data is not transferred from the network communication processing unit 1702 to the job processing unit 1703. Subsequently, in step S1206, the CPU 201 deletes the corresponding job from the job list screen as in the screen E illustrated in FIG. 13. In addition, at this moment, no trace of print processing for the job remains in a job history as in the screen F illustrated in FIG. 13.

Finally, in step S1207, the CPU 201 transmits an Update-Job-Status operation to the printing service 101 to set Job Status=cancelled.

In a case where the job cannot be deleted in the printing service 101 even if the Update-Job-Status operation for "cancelled" is transmitted, an Update-Job-Status operation for "aborted" may be transmitted. The status for the transmission may be changed depending on in which status the job in the printing service 101 is to be deleted.

As described above, in a case where cancel is selected before start of printing in the printing apparatus 100, the printing apparatus 100 can perform pseudo cancel of a job on the printing service 101, by acquiring the corresponding print data from the printing service 101, and discarding the acquired print data upon reading, in the network communication processing unit 1702. Therefore, even with a protocol that prohibits a Cancel-Job operation from a printing apparatus as in the IPP-Infra, a job on the printing service 101 can be deleted from the printing apparatus 100 before starting the print processing.

Figure 15:
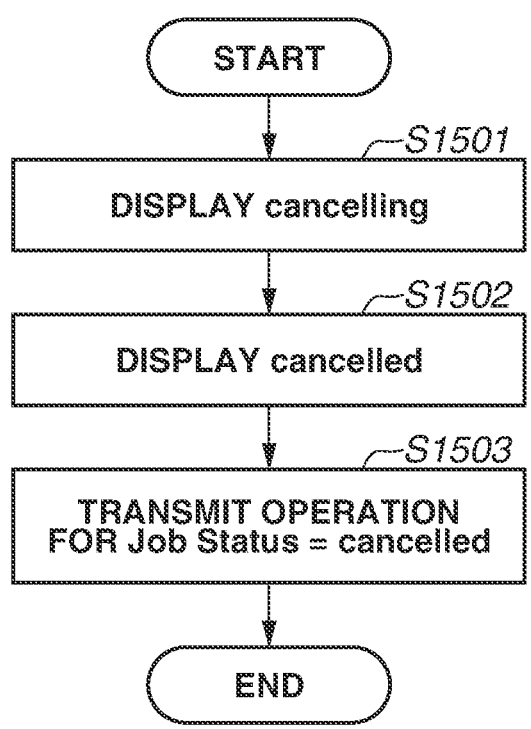
FIG. 15 is a flowchart illustrating a job cancel operation according to a second exemplary embodiment.
Figure 16:
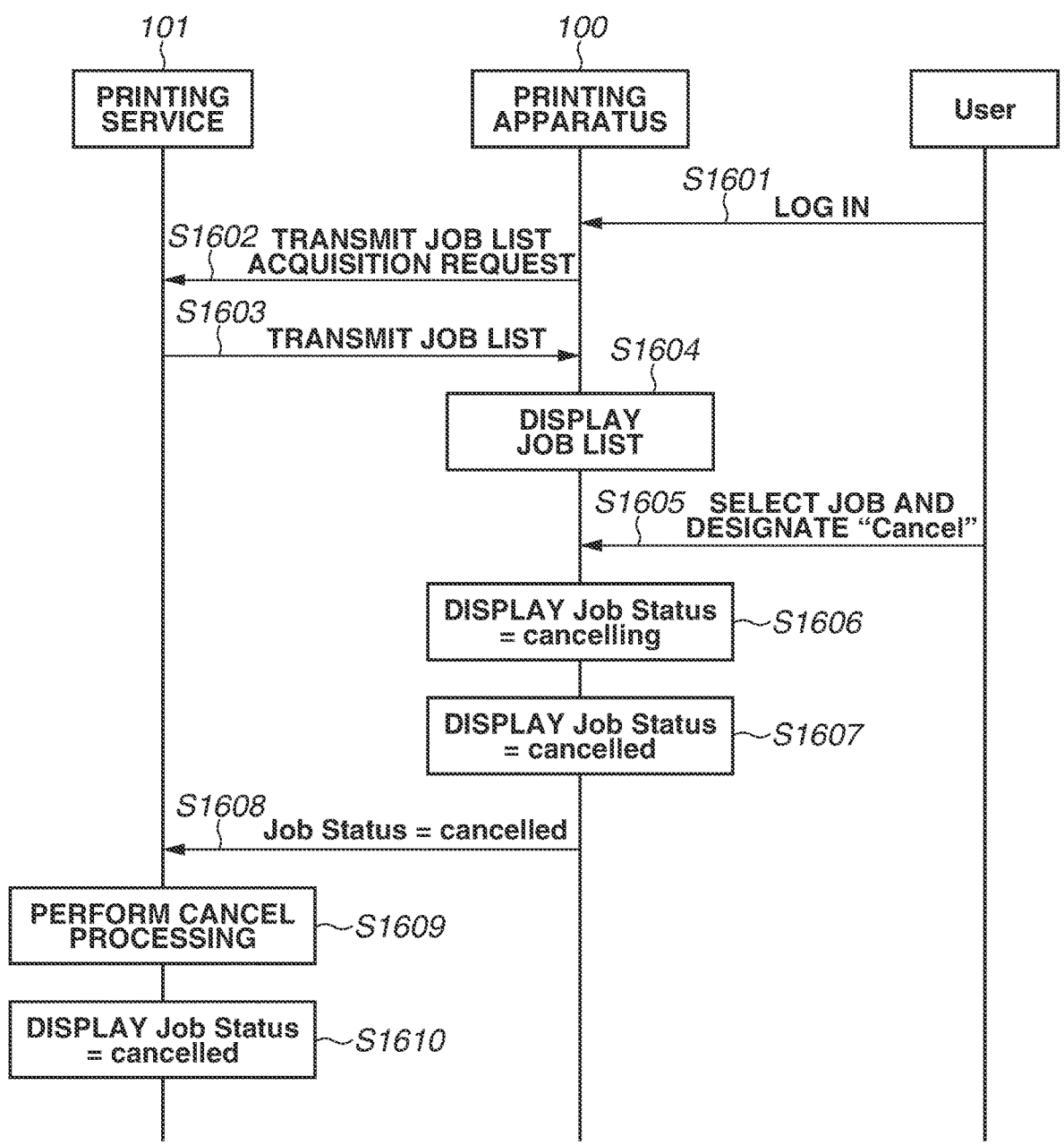
FIG. 16 is a sequence diagram illustrating a job cancel operation according to the second exemplary embodiment.

Next, a second exemplary embodiment will be described. In the description of the present exemplary embodiment, it is assumed that the printing service 101 has a function of cancelling a job when the printing service 101 receives a job cancel status. FIG. 15 is a flowchart illustrating processing to be performed by the printing apparatus 100 in the present exemplary embodiment. Further, FIG. 16 is a sequence diagram according to the present exemplary embodiment. Processing performed in step S1601 to step S1604 is similar to that performed in step S501 to step S504 in FIG. 5, step S601 to step S604 in FIG. 6, and step S901 to step S904 in FIG. 9, and therefore will not be described.

In step S1605, "Cancel" is pressed in a state where a job is selected from a job list screen. In step S1501 and step 1606, upon detecting this pressing, the CPU 201 changes the status of the corresponding job in the job list screen to a "cancelling" state. In step S1502 and step S1607, after the lapse of a predetermined time, the CPU 201 changes the status of the corresponding job in the job list screen to a "cancelled" state.

Next, in step S1503 and step S1608, the CPU 201 transmits an Update-Job-Status operation to the printing service 101 to set Job Status=cancelled. In step S1609, upon receiving this operation, the printing service 101 determines that this job is cancelled in the printing apparatus 100, and cancels the job from a storage area of the printing service 101. Subsequently, in step S1610, the printing service 101 changes the status of the corresponding job to "cancelled".

According to the present exemplary embodiment, the printing apparatus 100 may notify only the job status, without acquiring the job from the printing service 101 unlike the first exemplary embodiment. Therefore, a processing burden on the printing apparatus 100 is reduced.

Next, a third exemplary embodiment will be described with reference to FIG. 18. In the first exemplary embodiment, in a case where the cancel instruction is accepted from the user before starting the printing, the received image data is internally discarded upon reading in the network communication processing unit 1702, so that the image data is not transferred to the job processing unit 1703. In the present exemplary embodiment, there will be described an example in which received image data is transferred to the job processing unit 1703 without being discarded upon reading in the network communication processing unit 1702, and then the job processing unit 1703 cancels the image data.

Figure 18:
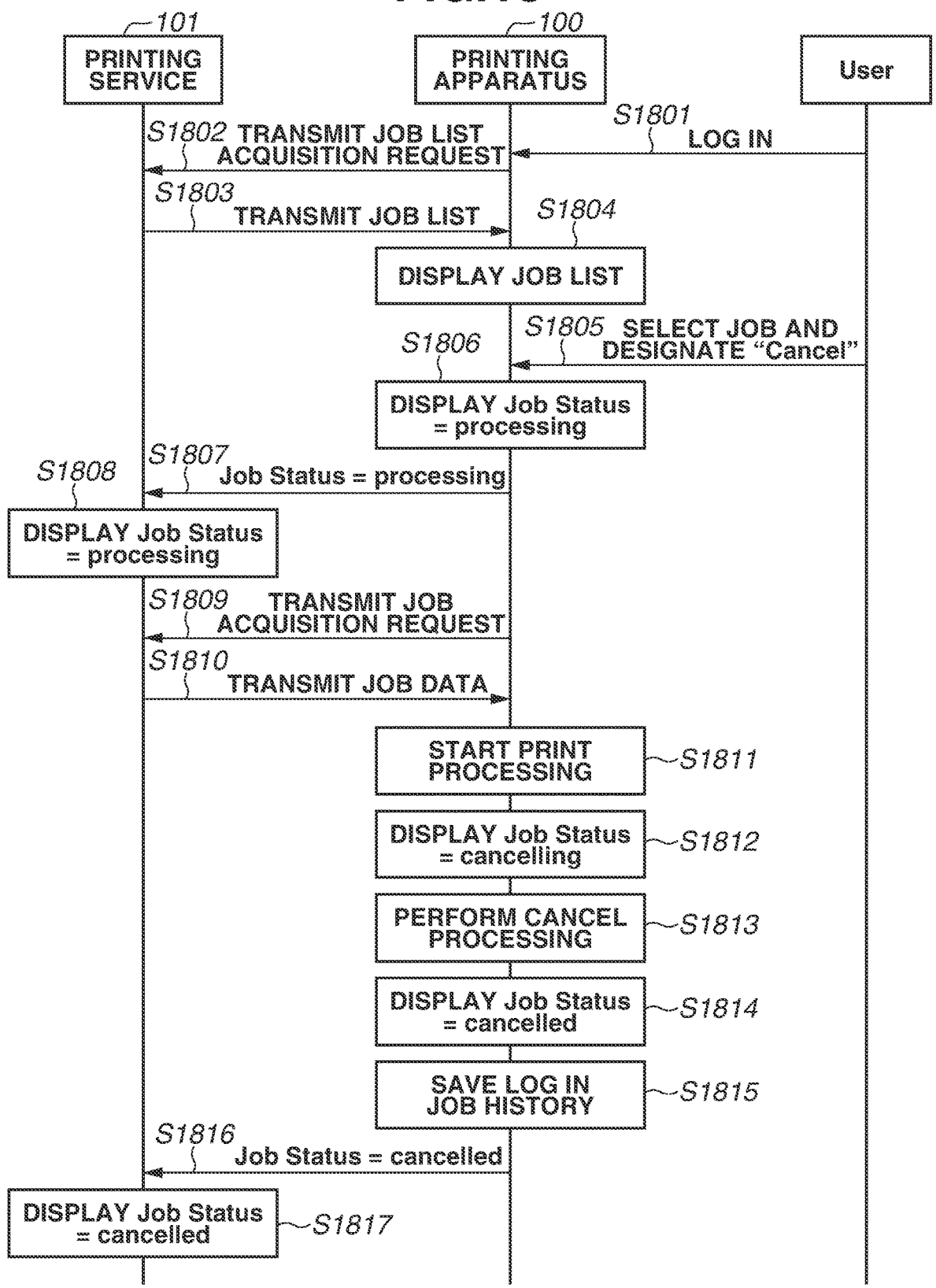
FIG. 18 is a sequence diagram illustrating a job cancel operation according to a third exemplary embodiment.

FIG. 18 is a sequence diagram according to the present exemplary embodiment. Processing performed in step S1801 to step S1810 is similar to that performed in step S601 to step S610 in FIG. 6, and therefore will not be described.

Upon successfully acquiring image data from the printing service 101 in step S1810, the CPU 201 starts print processing, but immediately executes cancel processing. Internally, image data is transferred from the network communication processing unit 1702 to the job processing unit 1703, and the job processing unit 1703 executes the print processing and the cancel processing.

In step S1811, the printing apparatus 100 starts the print processing based on the received image data. In step S1812, the printing apparatus 100 changes the status of the corresponding job in the job list screen to a "cancelling" state. Further, in step S1813, the printing apparatus 100 performs the cancel processing for the corresponding job. In step S1814, upon completing the cancel processing, the printing apparatus 100 changes the status of the corresponding job in the job list screen to "cancelled". In step S1815, the printing apparatus 100 saves this job in a job history as a cancel job. Finally, in step S1816, the printing apparatus 100 transmits an Update-Job-Status operation to the printing service 101 to set Job Status=cancelled. In step S1817, upon receiving this operation, the printing service 101 changes the status of the corresponding job to "cancelled".

According to the present exemplary embodiment, even with a protocol that prohibits a Cancel-Job operation from a printing apparatus as in the IPP-Infra, a job on the printing service 101 can be deleted from the printing apparatus 100 before starting the print processing, as with the first exemplary embodiment.

<Job Cancel in Push Printing>

In the first to third exemplary embodiments described above, "pull printing" is described as an example. In the "pull printing", when the user provides a print instruction in the printing apparatus 100, the printing apparatus 100 acquires print data from the printing service 101 and performs printing. In the present exemplary embodiment, job cancel in "push printing" will be described. In the "push printing", the printing apparatus 100 automatically acquires print data from the printing service 101 and prints the print data, without the user providing a print instruction in the printing apparatus 100. In the push printing, when print data is input from the client terminal 102 to the printing service 101 by a user, a job input notification is immediately provided to the printing apparatus 100 and print processing is executed. Therefore, unlike the pull printing, printing can be performed immediately.

Figure 19:
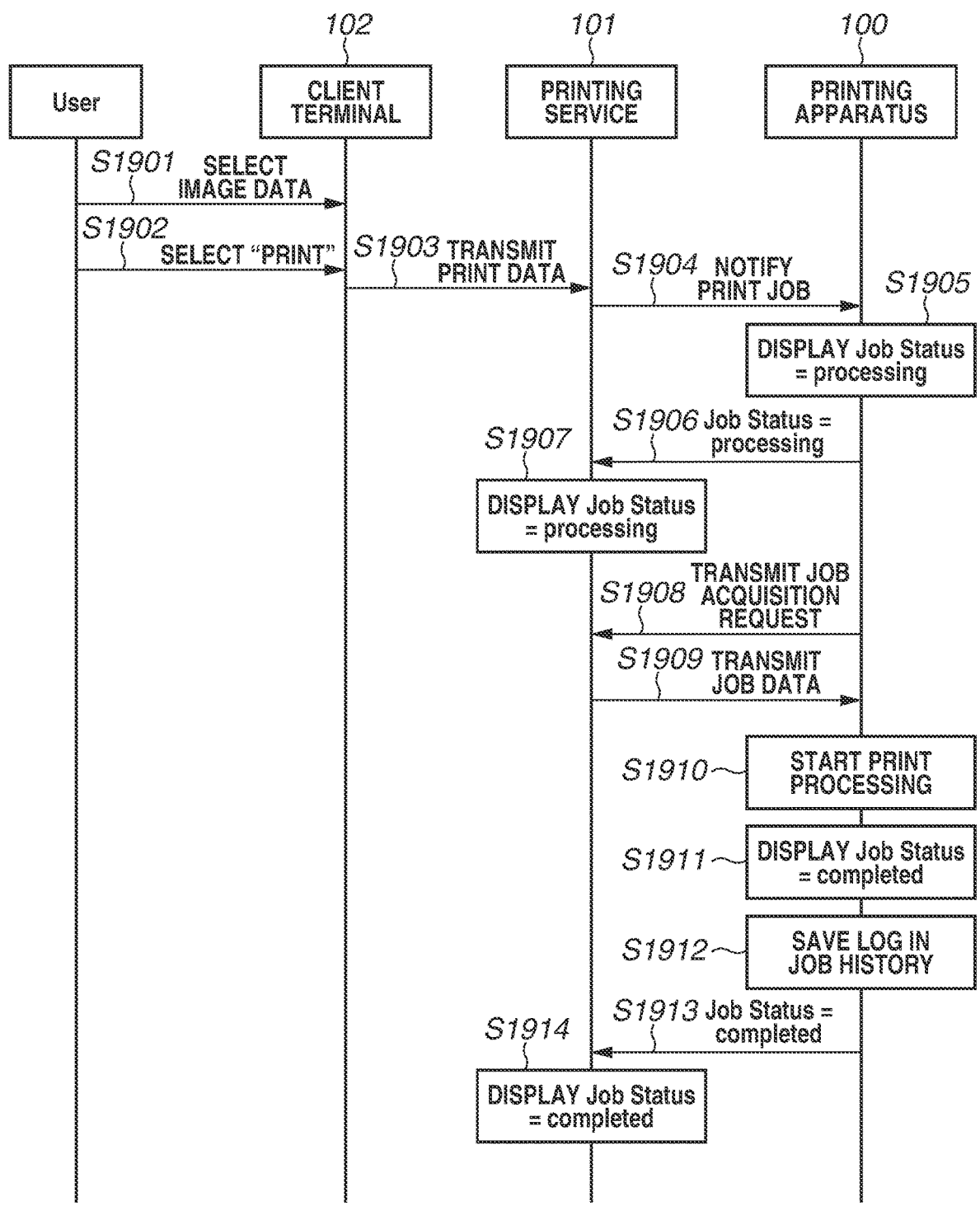
FIG. 19 is a sequence diagram illustrating a print processing operation according to a fourth exemplary embodiment.

FIG. 19 illustrates a sequence diagram illustrating the push printing. Processing performed in step S1901 to step S1903 up to input of print data from the client terminal 102 to the printing service 101 is similar to that performed in step S401 to step S403 in FIG. 4.

In step S1904, upon receiving the print data from the client terminal 102, the printing service 101 generates a print job, and provides a push notification for notifying the input of the print job to the printing apparatus 100. To provide the push notification from the printing service 101 to the printing apparatus 100 present in an office or at home, it is assumed that a protocol for continuing session establishment such as constant connection and long polling is used. In step S1905, upon receiving the notification of the print job, the printing apparatus 100 changes the status of the corresponding job in a job list screen to a "processing" state.

Next, in step S1906, the printing apparatus 100 transmits a job-status update notification to the printing service 101 to set Job Status=processing. This operation is implemented by transmitting an Update-Job-Status operation. In step S1907, upon receiving this operation, the printing service 101 changes the status of the corresponding job to "processing".

Subsequently, in step S1908, the printing apparatus 100 transmits a job acquisition request to the printing service 101 to acquire the input print job for printing. In the IPP, the job acquisition request is performed by using operations such as Fetch-Job, Acknowledge-Job, Fetch-Document, and Acknowledge-Document operations.

In step S1909, upon receiving the job acquisition request, the printing service 101 transmits job data to the printing apparatus 100. In step S1910, the printing apparatus 100 starts print processing based on the received print data. In step S1911, in a case where the print processing is normally completed, the printing apparatus 100 changes the status of the corresponding job in the job list screen to "completed". Further, in step S1912, the printing apparatus 100 saves a time at which the print processing is completed, a result, a user name, and a job name, as a job history.

Finally, in step S1913, the printing apparatus 100 transmits an Update-Job-Status operation to the printing service 101 to set Job Status=completed. In step S1914, upon receiving this operation, the printing service 101 changes the status of the corresponding job to "completed".

The push printing using the configuration of the IPP-Infra becomes possible by the above-described processing.

Next, FIG. 20 illustrates a sequence for cancelling a job in the push printing. In the push printing, because printing starts in the printing apparatus 100 without a print instruction provided by the user, a job cannot be cancelled before the printing starts. Accordingly, the job is cancelled after the printing starts, as with the processing in FIG. 9. Processing performed in step S2001 to step S2010 up to start of printing is similar to that performed in step S1901 to step S1910 in FIG. 19.

In step S2011, upon the printing apparatus 100 starting the print processing in step S2010, the user selects "Cancel" from the operation unit 209, for a job in processing for printing. In step S2012, the printing apparatus 100 changes the status of the corresponding job to a "cancelling" state. In step S2013, the printing apparatus 100 performs cancel processing. Internally, the job processing unit 1703 executes job cancel, for image data transferred from the network communication processing unit 1702 to the job processing unit 1703.

In step S2014, upon completing the cancel processing, the printing apparatus 100 changes the status of the corresponding job to a "cancelled" state. Further, in step S2015, the printing apparatus 100 saves a time at which the cancel processing is completed, a result, a user name, and a job name, as a job history.

Finally, in step S2016, the printing apparatus 100 transmits an Update-Job-Status operation to the printing service 101 to set Job Status=cancelled. In step S2017, upon receiving this operation, the printing service 101 changes the status of the corresponding job to "cancelled".

Whether to perform the pull printing or the push printing can be set in the printing apparatus 100 beforehand by the user. In a case where performing the pull printing is set, the sequence of any one of the first to third exemplary embodiments described above is executed. In a case where performing the push printing is set, the sequence in each of FIGS. 19 and 20 is executed.

As described above, according to each of the exemplary embodiments described above, in the printing apparatus that performs printing by acquiring print data from the printing service using the IPP, when the user provides a cancel instruction, the printing apparatus acquires the corresponding print data from the printing service and deletes the acquired print data. In this way, even with a protocol that prohibits the Cancel-Job operation in a printing apparatus as in the IPP-Infra, cancel can be performed in an operation procedure similar to a procedure using a protocol that permits a cancel operation. Therefore, in a case where there is an unnecessary print job, it is possible to delete the print job without taking time and labor such as activating a client terminal for deletion or requesting an administrator of a printing service to perform deletion, so that load to be carried out by a user for deletion of the print job can be reduced.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-104909, filed May 31, 2018, which is hereby incorporated by reference herein in its entirety.

What is claimed is:

1. A printing apparatus that receives print data from a printing service using Internet Printing Protocol (IPP) and executes printing the print data, the printing apparatus comprising:
   a printing device;
   at least one memory that stores a set of instructions; and
   at least one processor configured to execute the set of instructions, the set of instructions, when executed, causing the printing apparatus to perform operations comprising:
      displaying, on a display device, a list of print jobs held in the printing service, each of the print jobs being generated based on print data transmitted from a client terminal to the printing service;
      accepting a print instruction for a print job selected from the list displayed on the display device;
      sending, to the printing service, a request for transmitting print data corresponding to the print job of the accepted print instruction, and receiving the print data from the printing service;
      executing printing based on the print data received in response to the request triggered by the print instruction, using the printing device;
      accepting, via a screen displayed on the display device from a user, a cancel instruction for the print job selected from the list displayed on the display device; and
      sending, to the printing service, the request for transmitting print data corresponding to the print job of the accepted cancel instruction, and discarding the print data received from the printing service, without executing printing based on the print data received from the printing service.

2. The printing apparatus according to claim 1, wherein the instructions include an instruction for notifying the printing service that the print job is cancelled, in response to discarding of the print data received from the printing service.

3. The printing apparatus according to claim 1, wherein the instructions include an instruction for notifying the printing service that the print job is in processing, in response to acceptance of the cancel instruction for the selected print job.

4. The printing apparatus according to claim 1,
   wherein the instructions include an instruction for storing a job history including a time at which printing based on print data is performed by using the printing device, into a storage area,
   wherein in a case where print data received from the printing service is discarded, the job history is not stored into the storage area is not performed.

5. The printing apparatus according to claim 1,
   wherein the instructions include an instruction for sending, to the printing service, a request for a list of print jobs of a user having logged into the printing apparatus,
   wherein the list of print jobs of the user based on data obtained from the printing service as a response to the request is displayed on the display device.

6. A control method for a printing apparatus that receives print data from a printing service using Internet Printing Protocol (IPP) and executes printing of the print data, the control method comprising:
   displaying, on a display device, a list of print jobs held in the printing service, each of the print jobs being generated based on print data transmitted from a client terminal to the printing service;
   accepting a print instruction for a print job selected from the list displayed on the display device;
   sending, to the printing service, a request for transmitting print data corresponding to the print job of the accepted print instruction, and receiving the print data from the printing service;
   executing printing based on the print data received in response to the request triggered by the print instruction, using a printing device;
   accepting, via a screen displayed on the display device from a user, a cancel instruction for the print job selected from the list displayed on the display device; and
   sending, to the printing service, the request for transmitting print data corresponding to the print job of the accepted cancel instruction, and discarding the print data received from the printing service, without executing printing based on the print data.

7. A non-transitory computer readable storage medium that stores a program for causing a computer of a printing apparatus to execute a control method for the printing apparatus that receives print data from a printing service using Internet Printing Protocol (IPP) and executes printing of the print data, the control method comprising:
   displaying, on a display device, a list of print jobs held in the printing service, each of the print jobs being generated based on print data transmitted from a client terminal to the printing service;
   accepting a print instruction for a print job selected from the list displayed on the display device;
   sending, to the printing service, a request for transmitting print data corresponding to the print job of the accepted print instruction, and receiving the print data from the printing service;

executing printing based on the print data received in response to the request triggered by the print instruction, using a printing device;

accepting, via a screen displayed on the display device from a user, a cancel instruction for the print job selected from the list displayed on the display device; and sending, to the printing service, the request for transmitting print data corresponding to the print job of the accepted cancel instruction, and discarding the print data received from the printing service, without executing printing based on the print data.

* * * * *